US007236312B2

(12) United States Patent
Yasui et al.

(10) Patent No.: US 7,236,312 B2
(45) Date of Patent: Jun. 26, 2007

(54) COLLAPSIBLE LENS BARREL AND IMAGING DEVICE

(75) Inventors: Tomohiro Yasui, Tokyo (JP); Masanori Hayashi, Chiba (JP); Yoshikazu Ito, Gifu (JP); Hideki Yamaoka, Gifu (JP); Kentaro Tashita, Gifu (JP)

(73) Assignee: Sony Corporation, Tokyo (JP)

( * ) Notice: Subject to any disclaimer, the term of this patent is extended or adjusted under 35 U.S.C. 154(b) by 88 days.

(21) Appl. No.: 11/207,880

(22) Filed: Aug. 22, 2005

(65) Prior Publication Data
US 2006/0061877 A1  Mar. 23, 2006

(30) Foreign Application Priority Data
Aug. 23, 2004  (JP)  ............ P2004-242494

(51) Int. Cl.
*G02B 15/14* (2006.01)
*G03B 5/02* (2006.01)
(52) U.S. Cl. .............. 359/699; 359/700; 396/349
(58) Field of Classification Search .............. 359/694, 359/699–704, 823; 396/349, 350; 348/373–376
See application file for complete search history.

(56) References Cited

U.S. PATENT DOCUMENTS

| 2,537,900 | A |  | 1/1951 | Lee et al. .............. 359/820 |
| 4,944,030 | A |  | 7/1990 | Haraguchi et al. ............ 396/62 |
| 5,570,149 | A | * | 10/1996 | Wakabayashi et al. ......... 396/85 |
| 5,663,839 | A | * | 9/1997 | Kanno ........................ 359/700 |
| 6,753,911 | B1 |  | 6/2004 | Yamada et al. .......... 348/240.3 |
| 2004/0125225 | A1 |  | 7/2004 | Noguchi ..................... 348/335 |

FOREIGN PATENT DOCUMENTS

JP  2002-267917  9/2002

OTHER PUBLICATIONS

European Search Report dated Nov. 30, 2005.

* cited by examiner

*Primary Examiner*—Timothy Thompson
*Assistant Examiner*—M. Hasan
(74) *Attorney, Agent, or Firm*—Finnegan, Henderson, Farabow, Garrett & Dunner, L.L.P.

(57) ABSTRACT

A lens barrel has a base, a second lens holder frame holding a second lens group, a first lens holder frame holding a first lens group, a cam ring, and a fixed ring. The second lens holder frame has three guides projecting axially from an outer circumferential portion of an annular plate and disposed at circumferentially equally spaced intervals. Guide grooves are defined in respective portions of the annular plate which are radially inwardly faced by the guides. Guide posts engage respectively in the guide grooves, so that the second lens holder frame is nonrotatably, but axially movably supported by the guide posts.

14 Claims, 29 Drawing Sheets

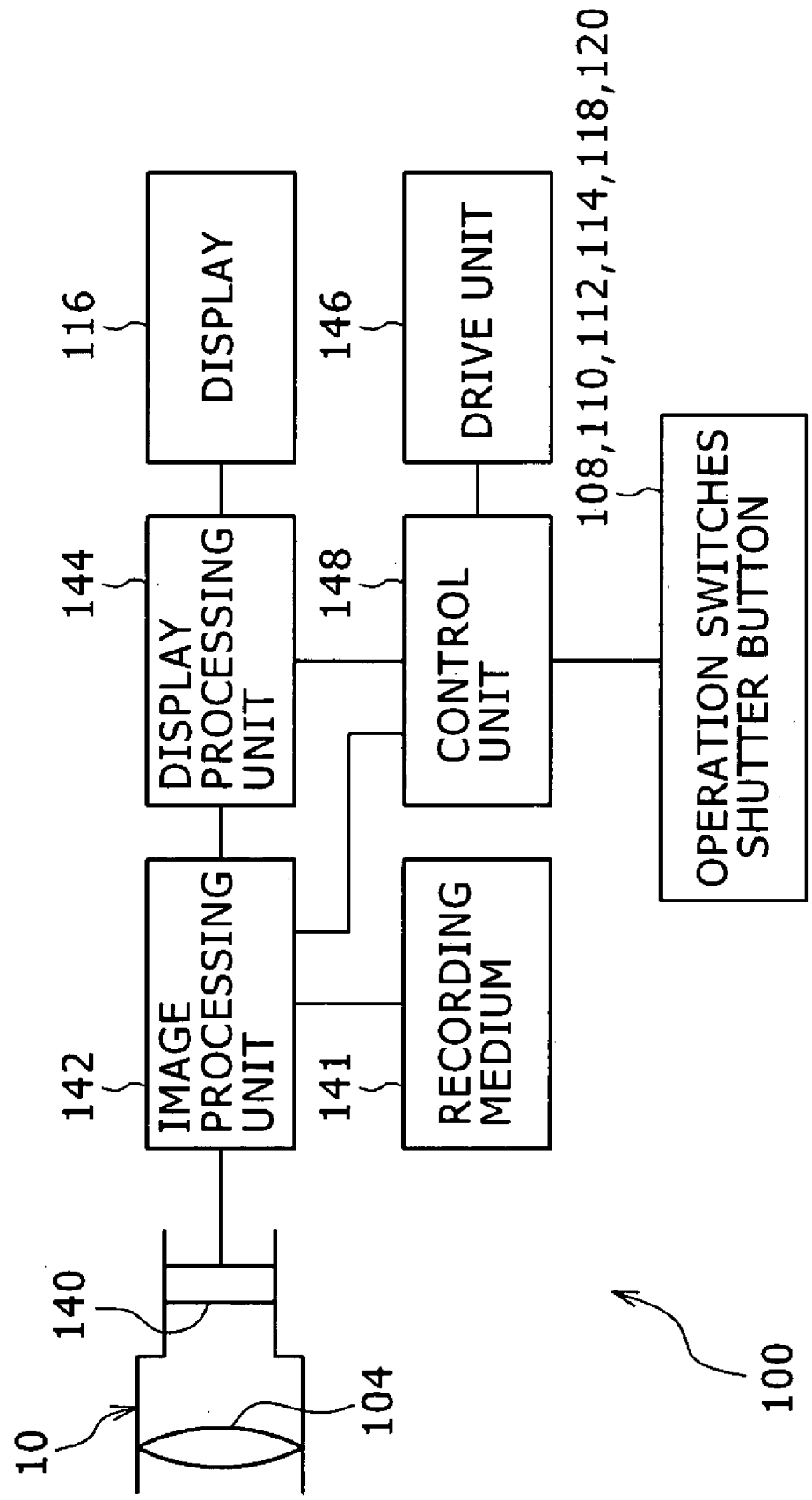

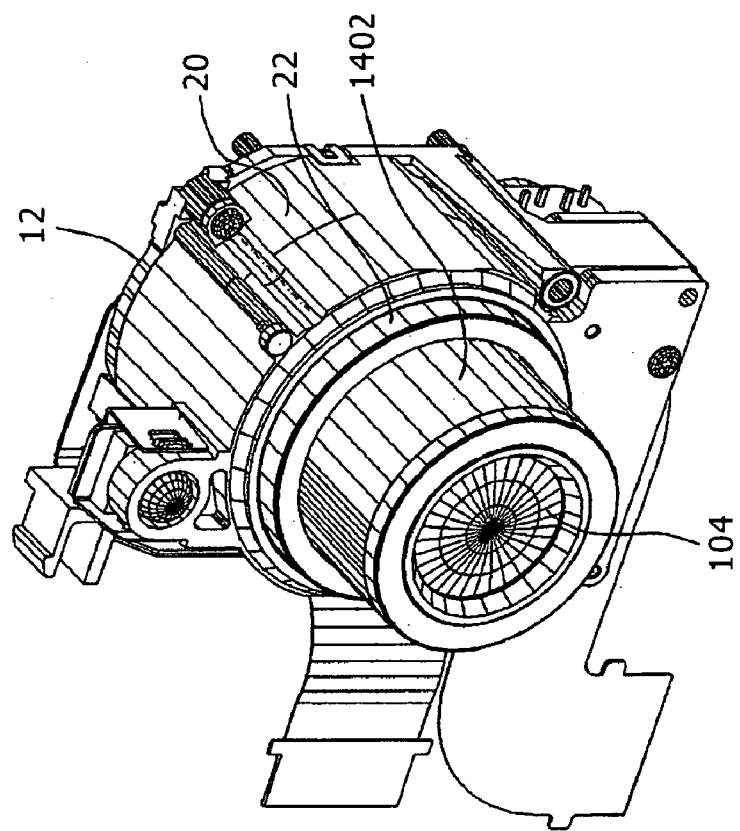
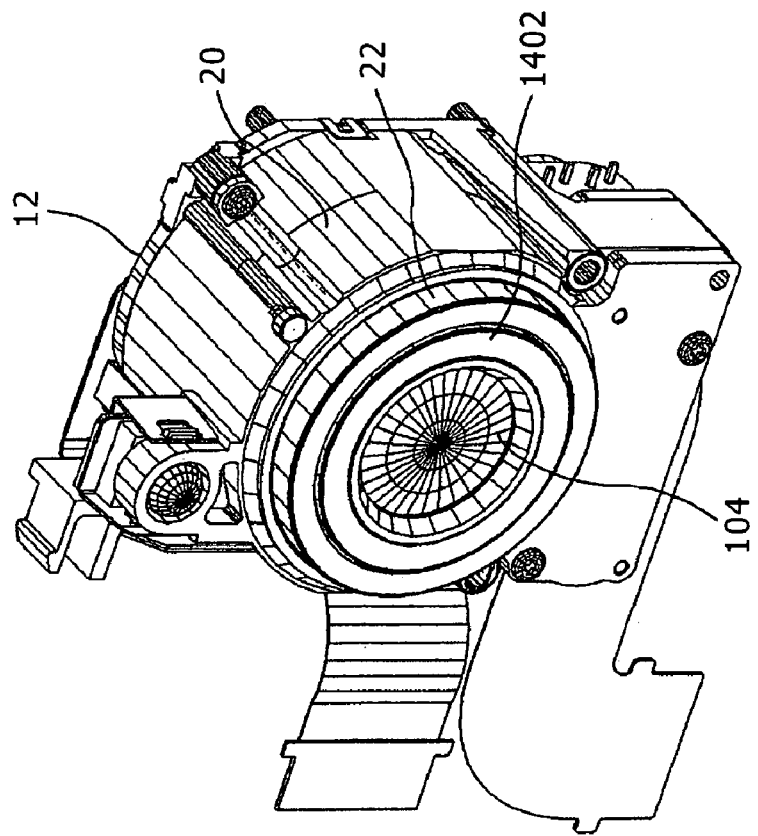

COLLAPSIBLE LENS BARREL AND IMAGING DEVICE

BACKGROUND OF THE INVENTION

The present invention relates to a collapsible lens barrel and an image pickup apparatus.

Some lens barrels incorporated in image pickup apparatuses such as digital still cameras, digital video cameras, etc. have a cam ring with a cam groove defined in an inner circumferential surface thereof and a lens holder frame which is nonrotatably, but axially movably held radially in the cam ring and which holds a lens assembly. The lens holder frame has a cam pin engaging in the cam groove such that the lens holder frame moves axially when the cam ring rotates about its own axis. For details, see Japanese Patent Laid-open No. 2002-267917, for example.

One such lens barrel is illustrated in FIG. 30 of the accompanying drawings. As shown in FIG. 30, the lens barrel has a linear guide ring 3 interposed between the outer circumferential surface of a lens holder frame 1 and the inner circumferential surface of a cam ring 2.

The linear guide ring 3 is nonrotatably mounted on the lens barrel 1 and has axially linear guide grooves 3A defined therein. Cam pins 1A of the lens holder frame 1 extend through the guide grooves 3A and engage in cam grooves 2A defined in the cam ring 2. The lens holder frame 1 is nonrotatably, but axially movably held radially in the cam ring 2.

With the lens barrel in related art, however, since the linear guide ring 3 is interposed between the outer circumferential surface of the lens holder frame 1 and the inner circumferential surface of the cam ring 2, it poses limitations on efforts to reduce the diameter of the lens barrel and hence size of the lens barrel.

If the lens barrel has two lens holder frames 1 (only one lens holder frame 1 is shown in FIG. 30), then the cam grooves 2A in the cam ring 2 which are engaged by the cam pins 1A, 1B of the lens holder frames 1 extend continuously circumferentially at least fully around the cam ring 2, and the cam pins 1A, 1B are guided at different positions in the guide grooves 3A in the linear guide ring 3.

The lens holder frames 1 are assembled into the cam ring 2 with the linear guide ring 3 interposed therebetween, as follows.

First, the linear guide ring 3 is inserted into the cam ring 2, and then turned to align the guide grooves 3A with open ends 2B of the cam grooves 2A in the cam ring 2. Then, the cam pins 1A of one of the lens holder frames 1 are inserted into the open ends 2B and caused to engage in the cam grooves 2A.

Then, the cam ring 2 is rotated by one revolution to move the one of the lens holder frames 1 axially.

Thereafter, the linear guide ring 3 is turned to align the guide grooves 3A with the open ends 2B of the cam ring 2. Then, the cam pins 1B of the other lens holder frame 1 are inserted into the open ends 2B and caused to engage in the cam grooves 2A.

Then, the cam ring 2 is rotated to move the other lens holder frame 1 axially.

The assembling process is complex because the guide grooves 3A of the linear guide ring 3 need to be aligned with the open ends 2B of the cam grooves 2A twice and the linear guide ring 3 needs to be rotated by one revolution.

SUMMARY OF THE INVENTION

The present invention provides a collapsible lens barrel and an image pickup apparatus which are reduced in size and can easily be assembled.

According to an embodiment of the present invention, there is provided a collapsible lens barrel including a base, a cam ring rotatably, but axially immovably mounted on the base, a cam groove defined in an inner circumferential surface of the cam ring and extending circumferentially, a lens holder frame nonrotatably, but axially movably disposed radially inwardly of the cam ring, and holding a lens assembly, and a cam pin projecting from an outer circumferential surface of the lens holder frame and engaging in the cam groove, wherein when the cam ring rotates, the cam pin is guided by the cam groove to cause the lens holder frame to move axially, the base having at least two guide posts projecting axially therefrom and disposed at spaced intervals in a circumferential direction of the cam ring, and the lens holder frame having guide grooves defined in an inner circumferential surface thereof, the guide posts engaging in the guide grooves, respectively, whereby the lens holder frame is nonrotatably, but axially movably supported by the guide posts.

According to another embodiment of the present invention, there is also provided a collapsible lens barrel including a base, a cam ring rotatably, but axially immovably mounted on the base, a cam groove defined in an inner circumferential surface of the cam ring and extending circumferentially, a first lens holder frame nonrotatably, but axially movably disposed radially inwardly of the cam ring, and holding a first lens assembly, a second lens holder frame nonrotatably, but axially movably disposed radially inwardly of the first lens holder frame, and holding a second lens assembly, a first cam pin projecting from an outer circumferential surface of the first lens holder frame and engaging in the cam groove, a second cam pin extending from an outer circumferential surface of the second lens holder frame through the outer circumferential surface of the first lens holder frame, projecting from the outer circumferential surface of the first lens holder frame, and engaging in the cam groove, wherein when the cam ring rotates, the first cam pin and the second cam pin are guided by the cam groove to cause the first lens holder frame and the second lens holder frame to move individually axially, the base having at least two guide posts projecting axially therefrom and disposed at spaced intervals in a circumferential direction of the cam ring, the second lens holder frame having guide grooves defined in an inner circumferential surface thereof, the guide posts engaging in the guide grooves, respectively, whereby the second lens holder frame is nonrotatably, but axially movably supported by the guide posts, and the first lens holder frame being nonrotatably, but axially movably supported on the outer circumferential surface of the second lens holder frame.

According to still another embodiment of the present invention, there is also provided an image pickup apparatus including a collapsible lens assembly having a lens assembly for introducing a subject image and an image pickup device for capturing the subject image introduced by the lens assembly, the collapsible lens assembly including a base, a cam ring rotatably, but axially immovably mounted on the base, a cam groove defined in an inner circumferential surface of the cam ring and extending circumferentially, a lens holder frame nonrotatably, but axially movably disposed radially inwardly of the cam ring, and holding the lens assembly; and a cam pin projecting from an outer circumferential surface of the lens holder frame and engaging in the cam groove, wherein when the cam ring rotates, the cam pin causes the lens holder frame to move axially, the base having at least two guide posts projecting axially therefrom and disposed at spaced intervals in a circumferential direction of the cam ring, and the lens holder frame having guide grooves defined in an inner circumferential surface thereof, the guide posts engaging in the guide grooves, respectively, whereby the lens holder frame is nonrotatably, but axially movably supported by the guide posts.

According to yet another embodiment of the present invention, there is also provided an image pickup apparatus including a collapsible lens assembly having a lens system for introducing a subject image and an image pickup device for capturing the subject image introduced by the lens assembly, the collapsible lens assembly including a base, a cam ring rotatably, but axially immovably mounted on the base, a cam groove defined in an inner circumferential surface of the cam ring and extending circumferentially, a first lens holder frame nonrotatably, but axially movably disposed radially inwardly of the cam ring, and holding a first lens assembly of the lens system, a second lens holder frame nonrotatably, but axially movably disposed radially inwardly of the first lens holder frame, and holding a second lens assembly of the lens system, a first cam pin projecting from an outer circumferential surface of the first lens holder frame and engaging in the cam groove, wherein the cam ring rotates, the first cam pin causes the first lens holder to move axially, a second cam pin extending from an outer circumferential surface of the second lens holder frame through the outer circumferential surface of the first lens holder frame, projecting from the outer circumferential surface of the first lens holder frame, and engaging in the cam groove, wherein when the cam ring rotates, the second cam pin causes the second lens holder frame to move individually axially, the base having at least two guide posts projecting axially therefrom and disposed at spaced intervals in a circumferential direction of the cam ring, the second lens holder frame having guide grooves defined in an inner circumferential surface thereof, the guide posts engaging in the guide grooves, respectively, whereby the second lens holder frame is nonrotatably, but axially movably supported by the guide posts, and the first lens holder frame being nonrotatably, but axially movably supported on the outer circumferential surface of the second lens holder frame.

According to the present invention, the at least two guide posts project from the base parallel to the optical axis of the lens barrel and are disposed at spaced intervals in the circumferential direction of the cam ring. The inner circumferential surface of the lens holder frame engages the guide posts, so that the lens holder frame is nonrotatably, but axially movably supported by the guide posts. Components of the lens barrel can thus be disposed in spaces between the guide 3 posts on a circle passing through the guide posts around the optical axis. Therefore, the diametrical dimension of the lens barrel and hence the size of the image pickup apparatus may be smaller than if the linear guide ring can be disposed between the outer circumferential surface of the lens holder frame and the inner circumferential surface of the cam ring as with the conventional arrangement.

Since the first lens holder frame is nonrotatably, but axially movably supported on the outer circumferential surface of the second lens holder frame, the diametrical dimension of the lens barrel and hence the size of the image pickup apparatus may be reduced.

For assembling the lens holder frame onto the base, the guide grooves in the lens holder frame are fitted over the respective guide posts of the base, and the lens holder frame is displaced along the guide posts toward the base. Therefore, the lens holder frame can easily be assembled onto the base.

The present invention provides a collapsible lens barrel and an image pickup apparatus which are reduced in size and can easily be assembled, is accomplished by the at least two guide posts mounted on the base at spaced intervals in the circumferential direction of the cam ring and the guide grooves defined in the inner circumferential surface of the lens holder frame, the guide posts engaging in the respective guide grooves.

The above and other objects, features, and advantages of the present invention will become apparent from the following description when taken in conjunction with the accompanying drawings which illustrate a preferred embodiment of the present invention by way of example.

BRIEF DESCRIPTION OF THE DRAWINGS

FIG. 3 is a block diagram of the image pickup apparatus according to the embodiment of the present invention;

FIG. 4A is a perspective view of a lens barrel with a lens assembly stored when not in use, i.e., in a collapsed state;

FIG. 4B is a perspective view of the lens barrel with the lens assembly projecting when in use, i.e., in a wide-angle state or a telephoto state;

DETAILED DESCRIPTION OF THE PREFERRED EMBODIMENT

Figure 1:
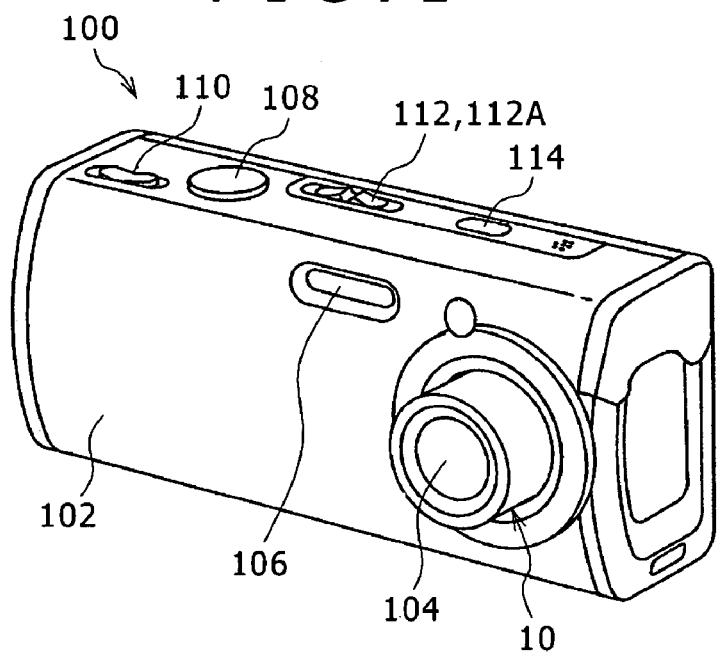
FIG. 1 is a front perspective view of an image pickup apparatus according to an embodiment of the present invention.

As shown in FIG. 1, an image pickup apparatus 100 according to an embodiment of the present invention includes a digital still camera and has an outer case 102. In the specification, the terms "left" and "right" are used with respect to the image pickup apparatus 100 as it is viewed from its front side, the term "front" refers to a direction toward a subject to be imaged along the optical axis of an optical system in the image pickup apparatus 100, and the term "rear" refers to a direction toward an image pickup apparatus along the optical axis of the optical system in the image pickup apparatus 100.

The image pickup apparatus 100 has a collapsible lens barrel 10 disposed on the front surface of the case 102 near a right end thereof and housing therein an image-capturing optical system 104. The image pickup apparatus 100 also has a flash unit 106 for emitting flash light, disposed on the front surface of the case 102 near an upper edge thereof.

The lens barrel 10 is movable between a used position (a wide-angle state, a telephoto state, or an intermediate state between the wide-angle state and the telephoto state) projecting forwardly from the front surface of the case 102 and a housed position (a collapsed state) in the front surface of the case 102, by an actuator 146 (FIG. 3) housed in the case 102.

Figure 2:
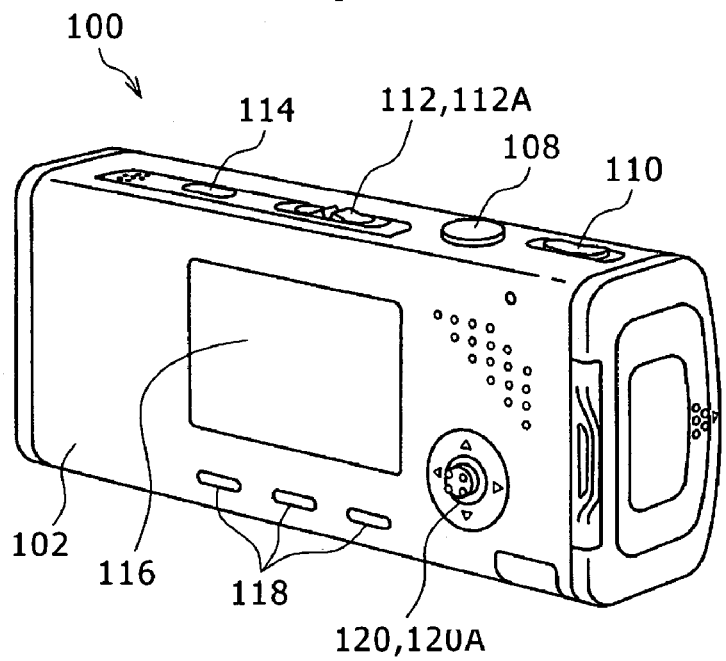
FIG. 2 is a rear perspective view of the image pickup apparatus according to the embodiment of the present invention.

The case 102 has on its upper end face a shutter button 108 for taking images, a zoom control switch 110 for adjusting the zooming of the image-capturing optical system 104, a mode selector switch 112 for selecting reproduction modes, and a power switch 114 for turning on and off the power supply of the image pickup apparatus 100. As shown in FIG. 2, the case 102 has on its rear surface a display panel 116 for displaying captured images, a plurality of mode control switches 118 for controlling various modes of operation including an image capturing mode, a recording mode, an image display mode, etc., and a control switch 120 for performing various control operations such as for selecting menus displayed on the display panel 116.

In the present embodiment, the mode selector switch 112 includes a slide switch and has a control member 112A projecting upwardly from the upper end face of the case 102. When the user slides the control member 112A to the left or the right with a finger, the mode selector switch 112 selects various reproduction modes.

The control switch 120 has a control member 120A projecting rearwardly from the rear surface of the case 102. The user can move the tip end of the control member 120A with a finger to tilt the control member 120A in any of four directions, i.e., upward, downward, leftward, and rightward directions, and can also press the tip end of the control member 120A with a finger toward the case 102.

Specifically, when the user moves the control member 120A in the upward, downward, leftward, and rightward directions, the control switch 120 moves a cursor displayed on the display panel 116 in the corresponding upward, downward, leftward, and rightward directions, or changes (increases or decreases) a numerical value displayed on the display panel 116. When the user presses the control button 120A, the control switch 120 determines a selected one of a plurality of items (menus) displayed on the display panel 116 or enters a numerical value displayed in an input box displayed on the display panel 116.

As shown in FIG. 3, an image pickup apparatus 140 such as a CCD or a CMOS sensor for capturing an image of a subject that is focused by the image-capturing optical system 104 is disposed in a rear portion of the lens barrel 10. The image pickup apparatus 100 includes an image processor 142 for generating image data based on a captured image signal output from the image pickup apparatus 140 and storing the image data in a storage medium 141 such as a memory card or the like, a display processor 144 for displaying the image data on the display 116, the actuator 146, and a controller 148. The controller 148 controls the image processor 142, the display processor 144, and the actuator 146 in response to signals from the shutter button 108, the zoom control switch 110, the motor selector switch 112, the power switch 114, the mode control switches 118, and the control switch 120. The controller 148 has a CPU which operates according to a control program.

Structural details of the lens barrel 10 will be described below.

In various figures to be described below, the surfaces of lenses, parts, and components include areas that are plotted with a plurality of straight lines. The straight lines are added for illustrative purposes, and the areas plotted with the straight lines actually represent cylindrical, curved, or spherical surfaces.

Figure 5:
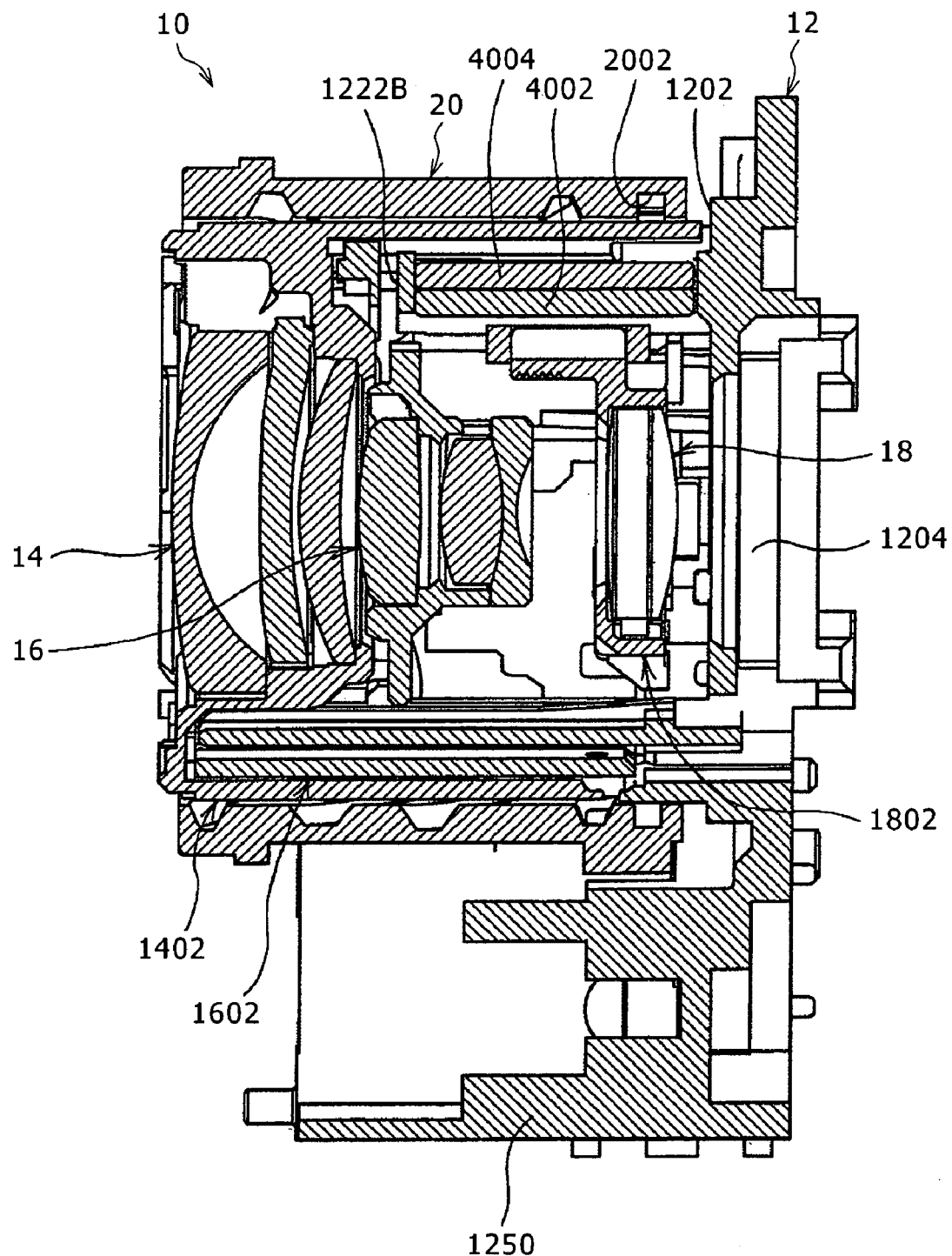
FIG. 5 is a cross-sectional view of the lens barrel in the collapsed state.
Figure 6:
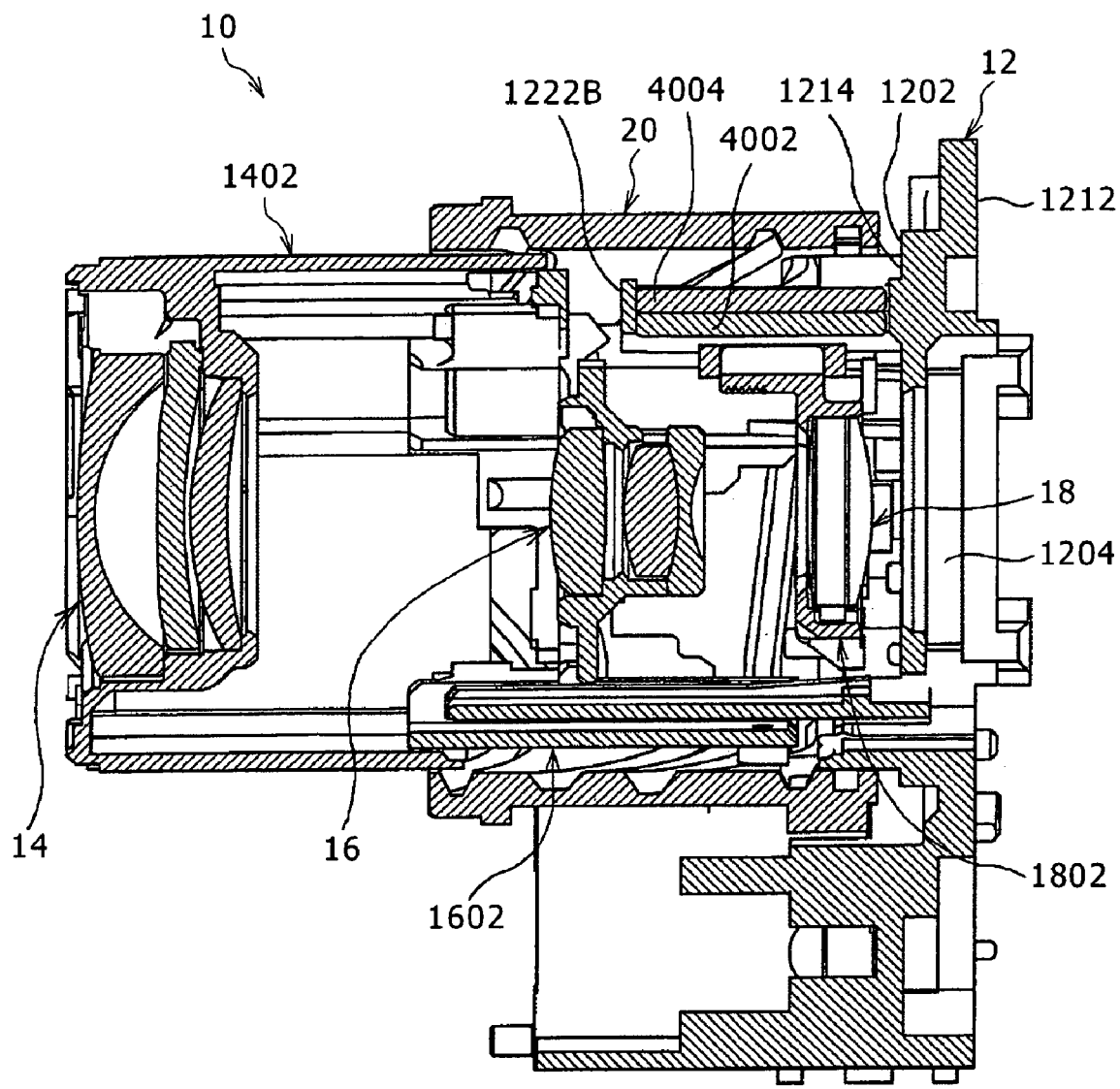
FIG. 6 is a cross-sectional view of the lens barrel in the wide-angle state.
Figure 7:
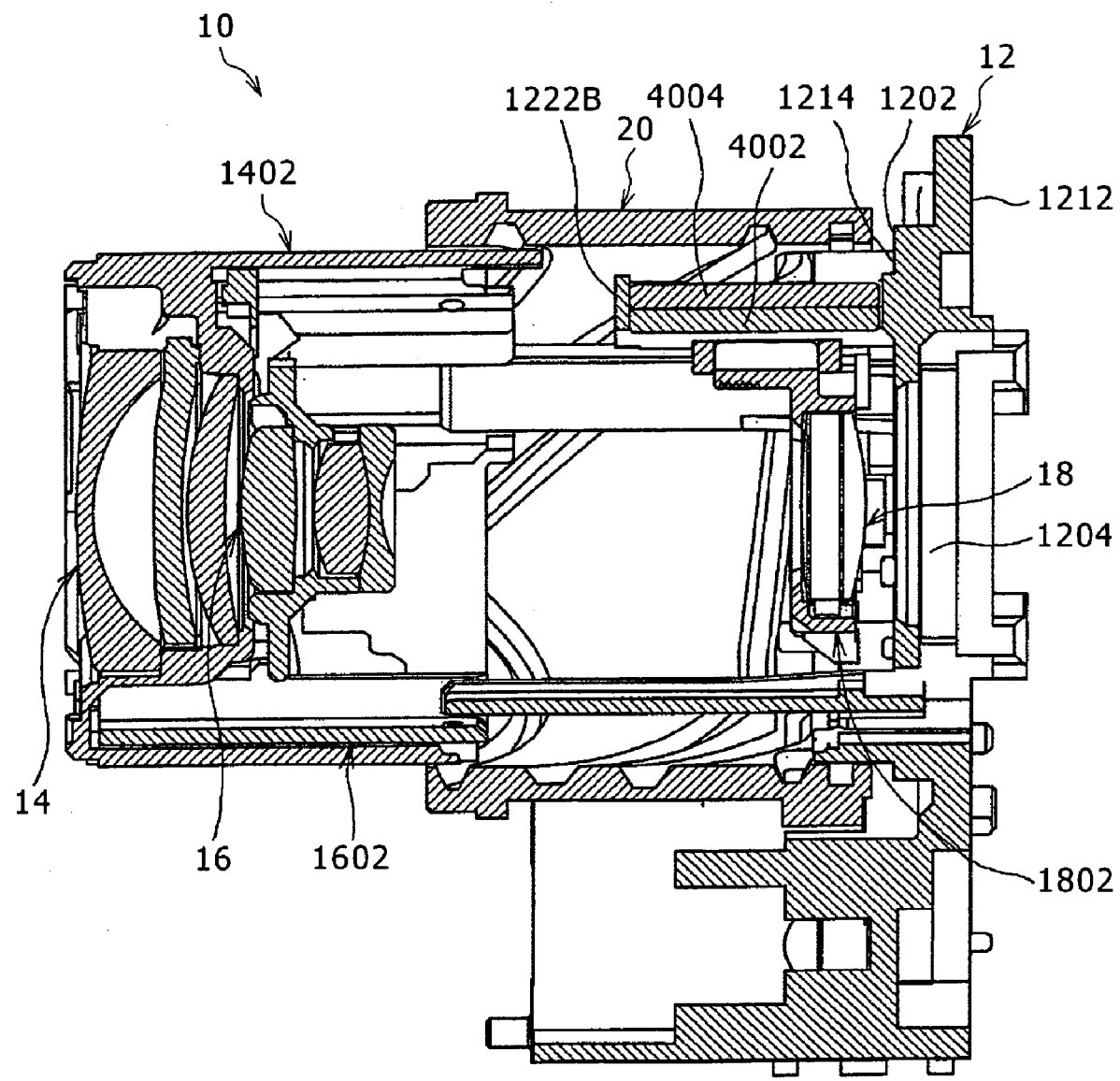
FIG. 7 is a cross-sectional view of the lens barrel in the telephoto state.

As shown in FIGS. 5 through 7, the image-capturing optical system 104 accommodated in the lens barrel 10 is of a three-group optical construction. Specifically, if it is assumed that the end of the lens barrel 10 (the image-capturing optical system 104) closer to the subject along the optical axis is referred to as a front end and the end of the lens barrel 10 (the image-capturing optical system 104) closer to the image pickup apparatus 140 along the optical axis is referred to as a rear end, then the image-capturing optical system 104 includes a first lens group 14, a second lens group 16, and a third lens group 18 that are successively arranged in the order named from the front end toward the rear end.

The lens barrel 10 makes a zooming action when the first lens group 14 and the second lens group 16 are displaced along the optical axis according to a predetermined cam curve, and makes a focusing action when the third lens group 18 is slightly displaced along the optical axis. Stated otherwise, the first lens group 14 and the second lens group 16 are displaced to change the focal length of the lens barrel 10, and the third lens group 18 is displaced to correct a deviation from a focused position which is caused by the changed focal length, thereby bringing the lens barrel 10 back into the focused position.

Figure 8:
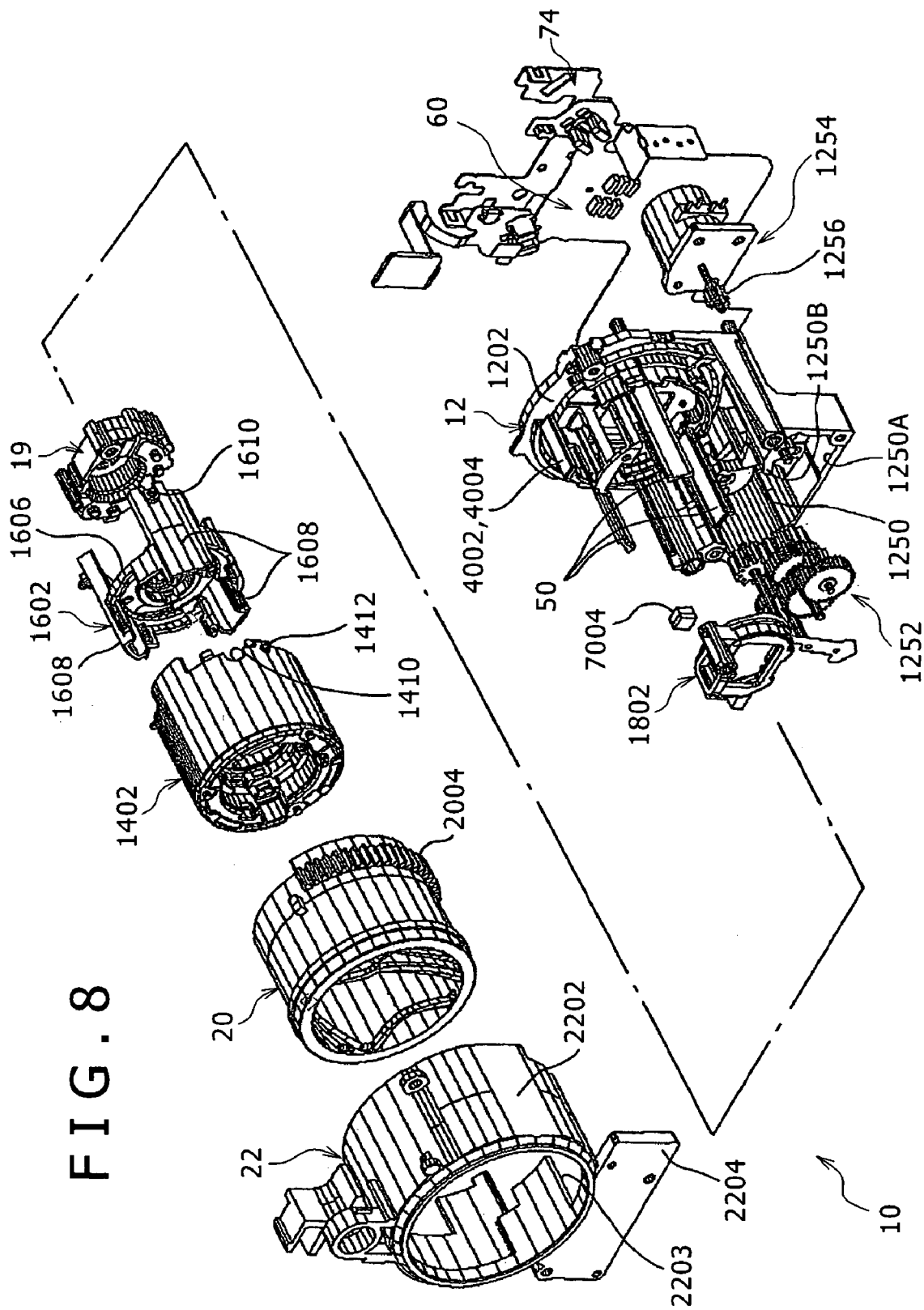
FIG. 8 is an exploded front perspective view of the lens barrel.
Figure 16:
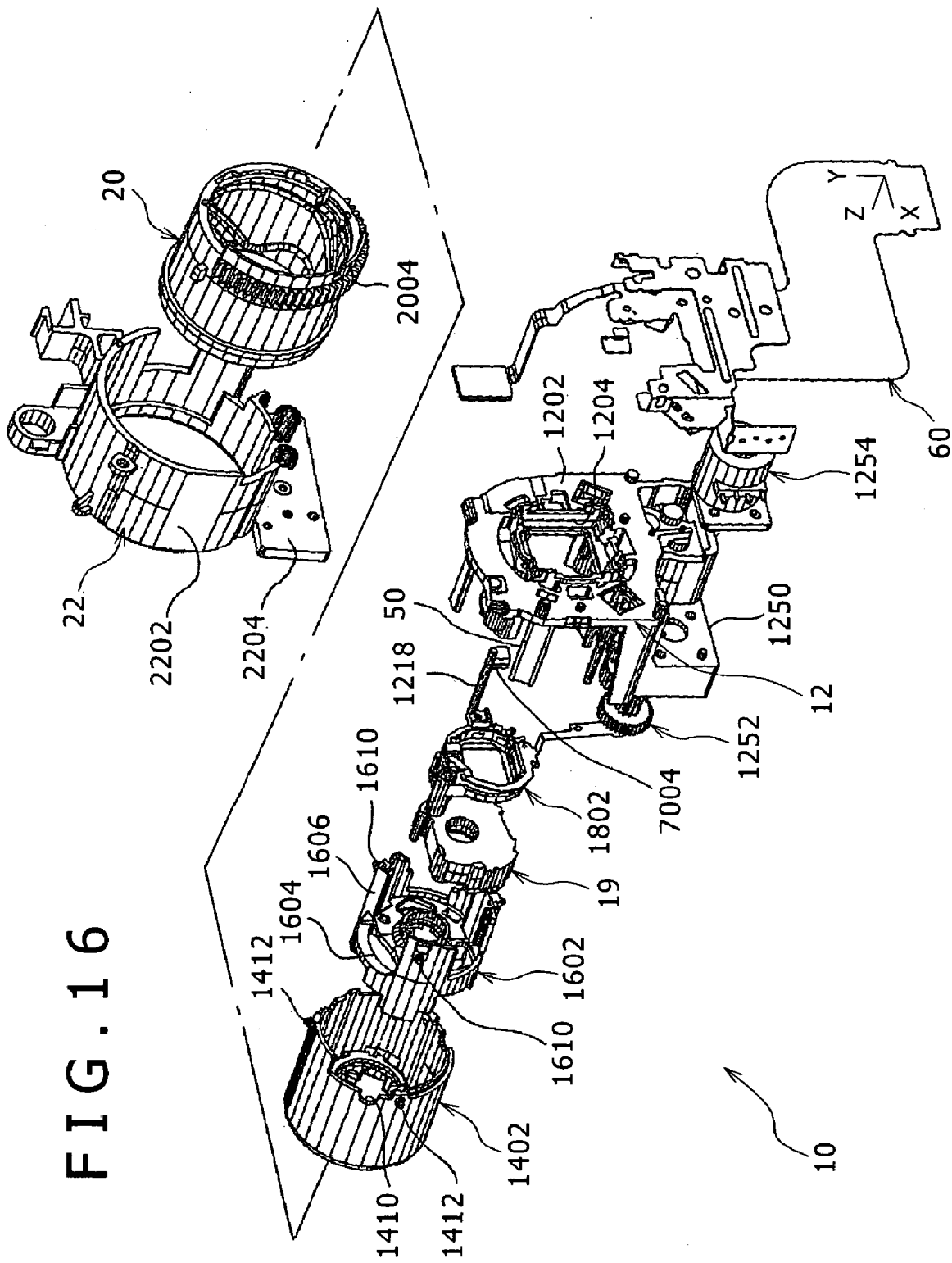
FIG. 16 is an exploded rear perspective view of the lens barrel.

As shown in FIGS. 8 and 16, the lens barrel 10 has a base 12 fixed to the case 102, a third lens holder frame 1802 holding the third lens group 18, an automatic exposure unit 19, a second lens holder frame 1602 holding the second lens group 16, a first lens holder frame 1402 holding the first lens group 14, a cam ring 20, and a fixed ring 22.

Figure 9:
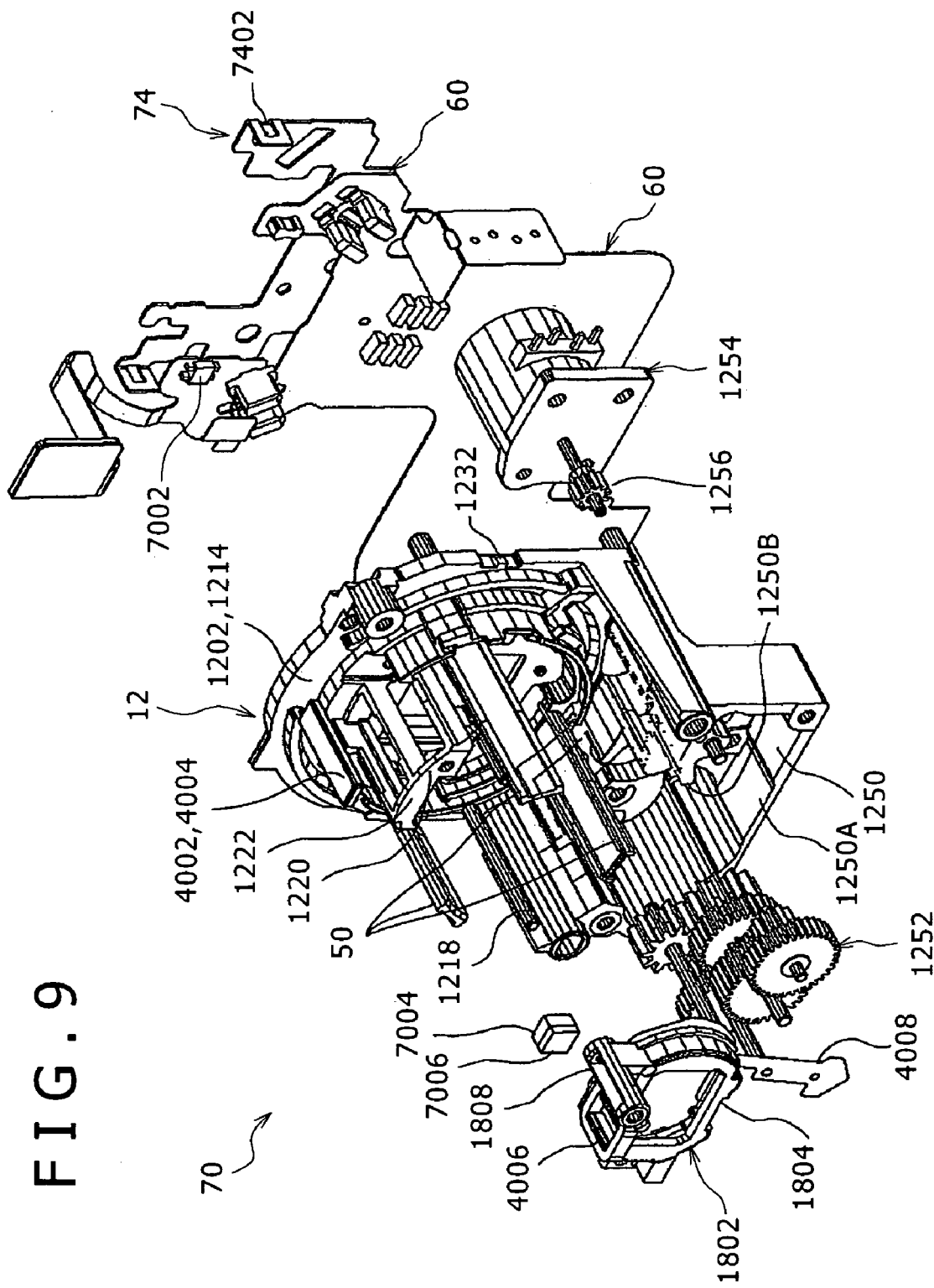
FIG. 9 is an exploded perspective view of a third lens holder frame, a base, and a flexible board of the lens barrel shown in FIG. 8.
Figure 17:
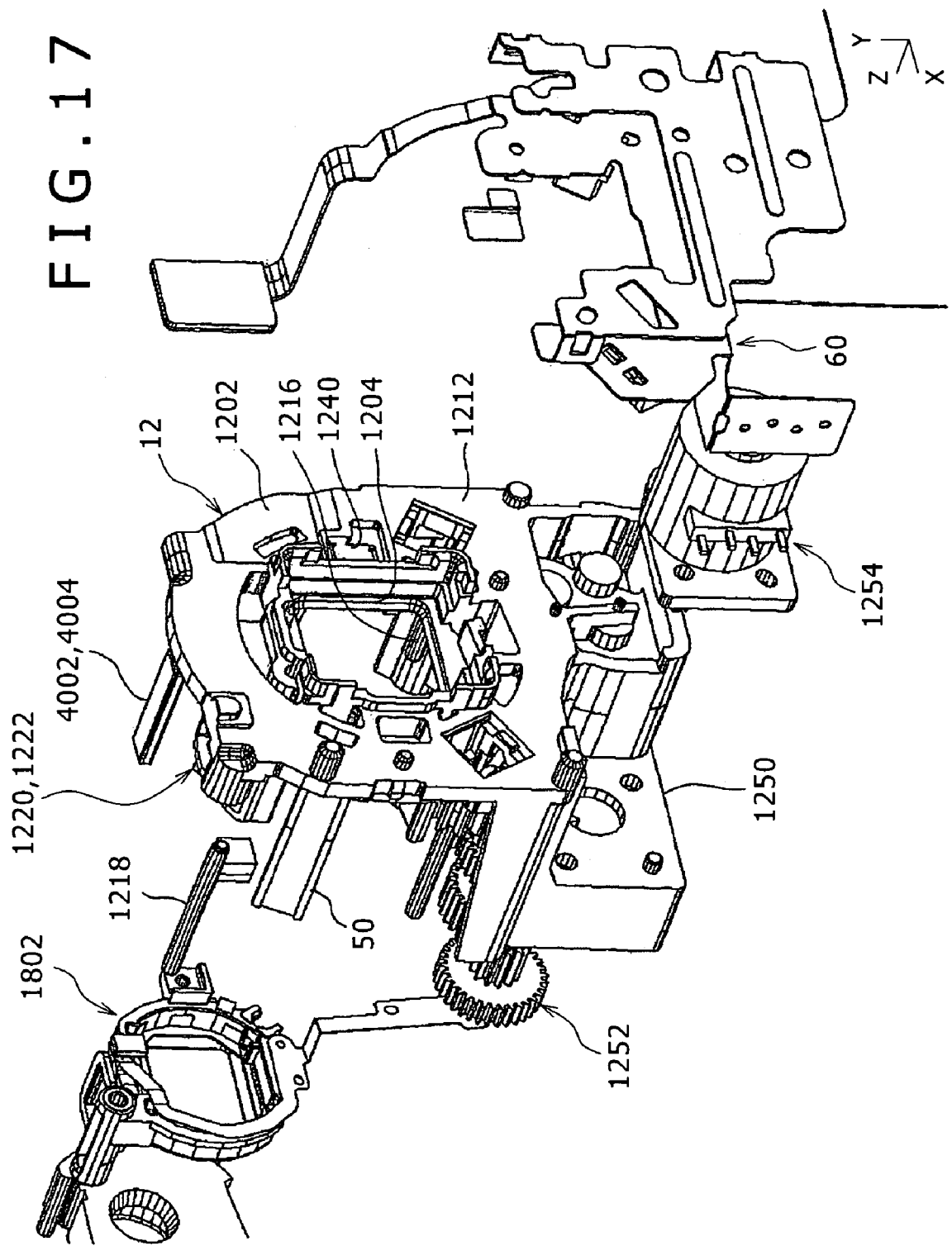
FIG. 17 is an exploded perspective view of the third lens holder frame, the base, and the flexible board of the lens barrel shown in FIG. 16.
Figure 25:
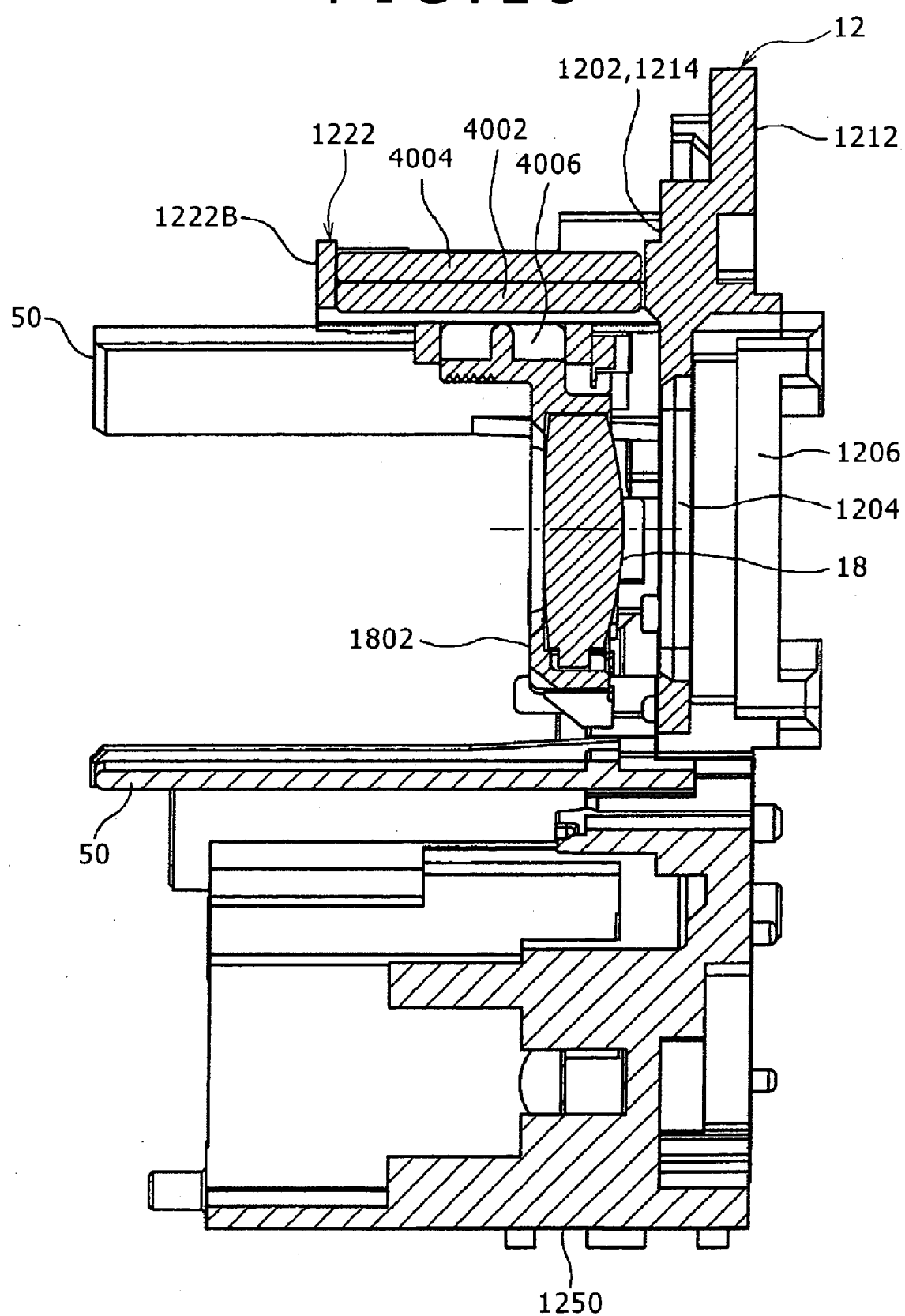
FIG. 25 is a cross-sectional view taken along line XXV—XXV of FIG. 24.
Figure 26:
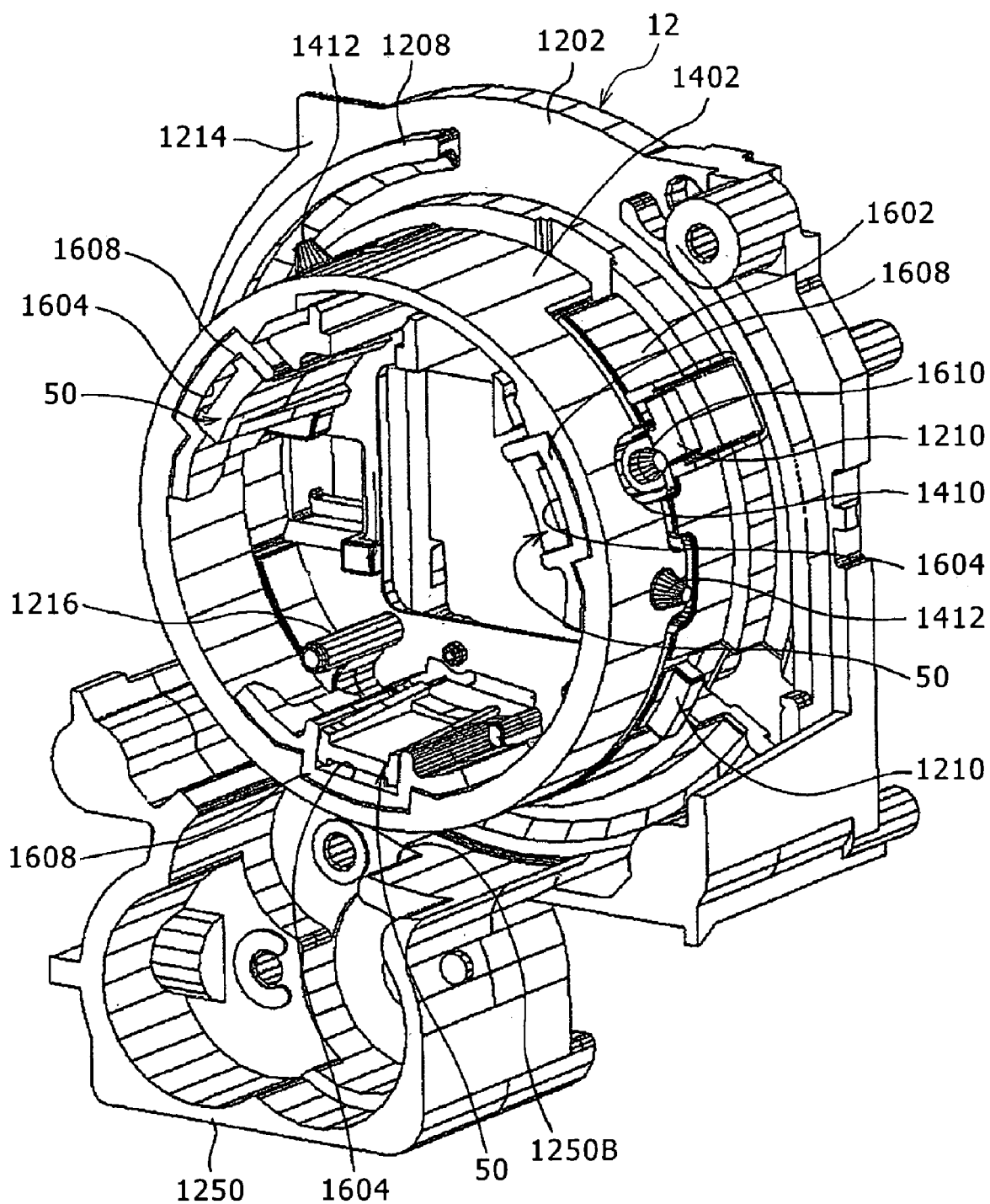
FIG. 26 is a perspective view of the first lens holder frame, the second lens holder frame, and the base which are assembled together, the view being cut off along a plane perpendicular to the optical axis.

As shown in FIGS. 9, 17, and 25, the base 12 includes a plate-like base body 1202 and a gear housing 1250 coupled to the base body 1202. In the present embodiment, the base 12 is made of synthetic resin.

The base body 1202 has a central opening 1204 defined therein and a rear surface 1212 facing rearwardly and having a recess 1206 surrounding the opening 1204. The image pickup apparatus 140 is mounted in the recess 1206 as by bonding such that the image pickup apparatus 140 has an imaging surface facing the opening 1204.

Figure 12:
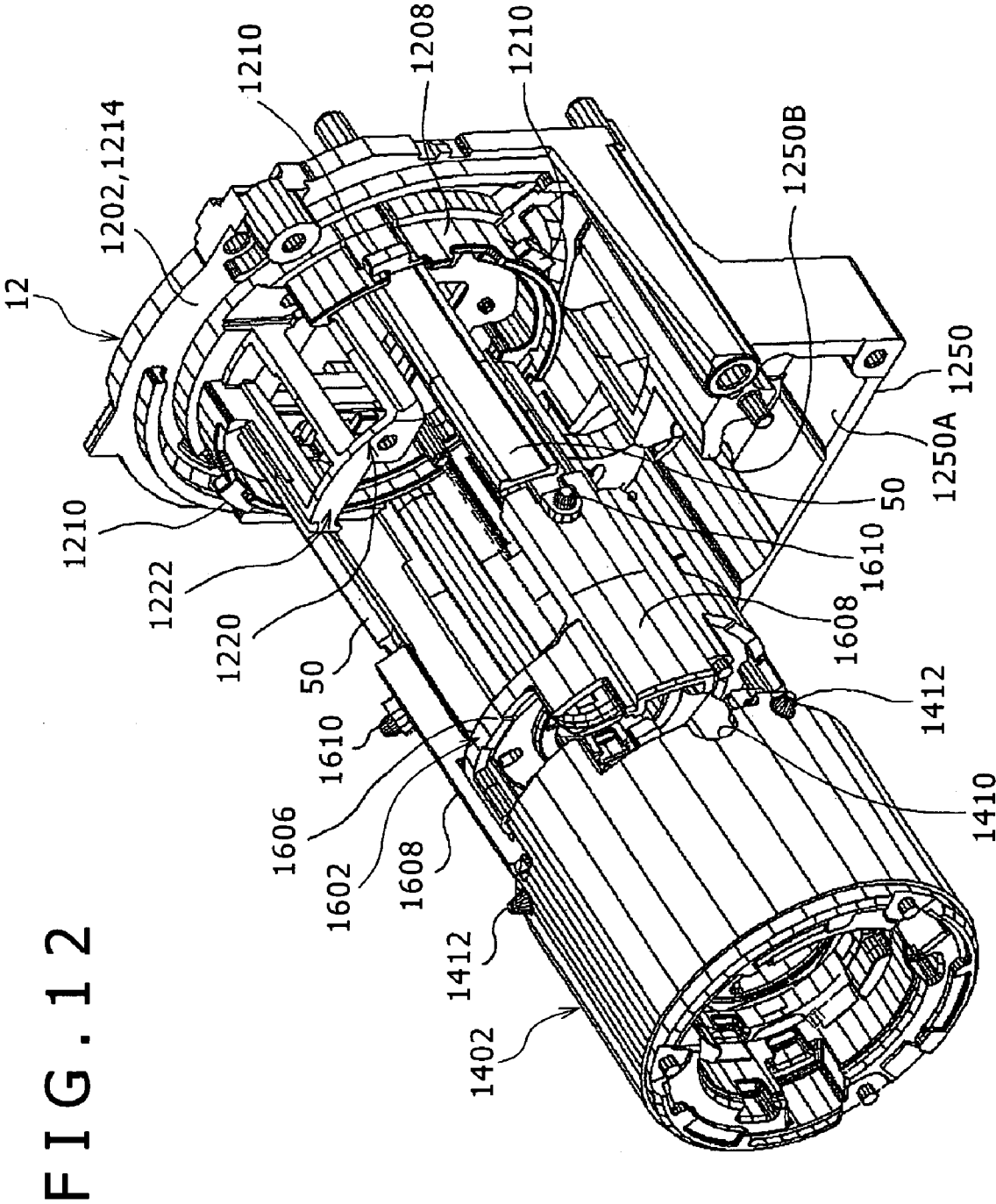
FIG. 12 is an exploded perspective view of the first lens holder frame, the second lens holder frame, and the base.
Figure 13:
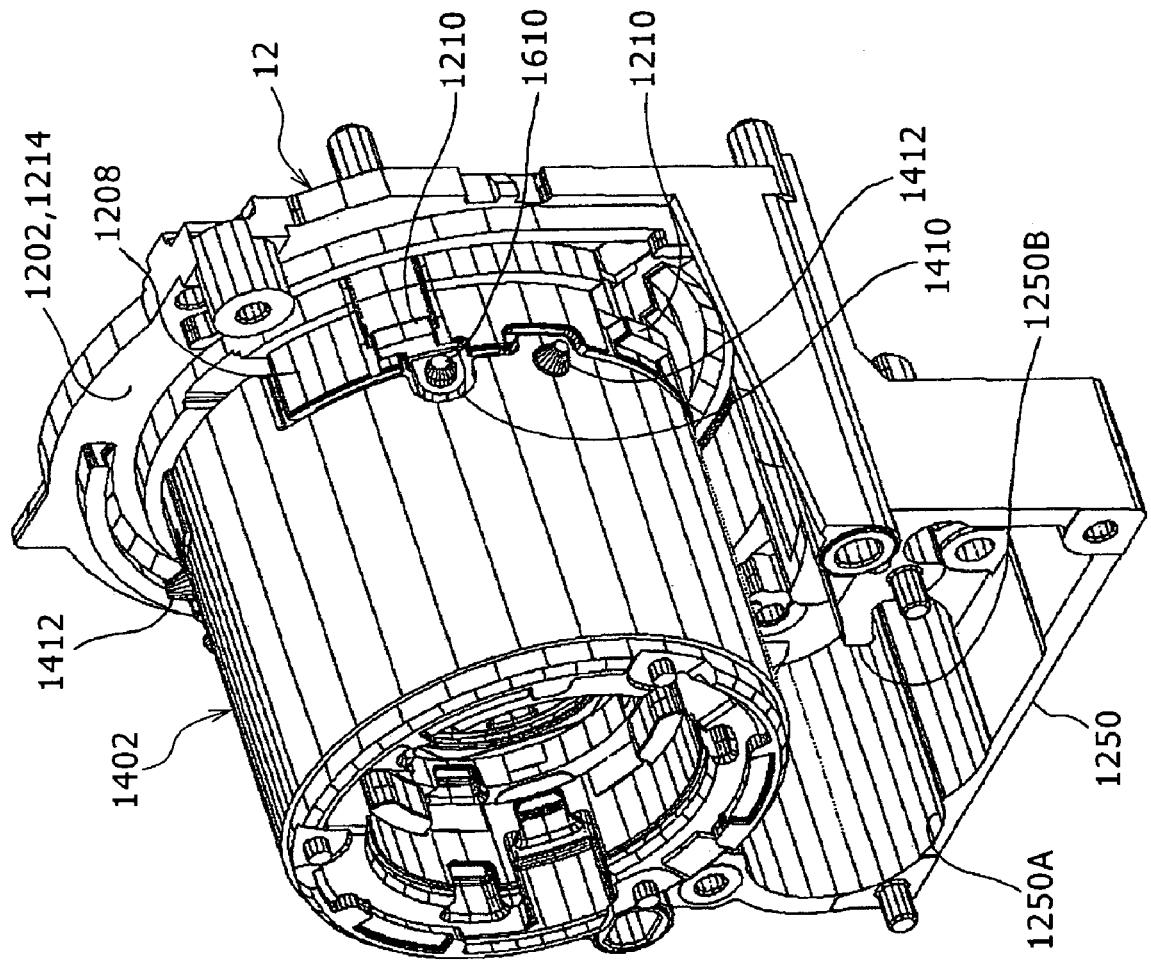
FIG. 13 is a perspective view of the first lens holder frame, the second lens holder frame, and the base which are assembled together.
Figure 14:
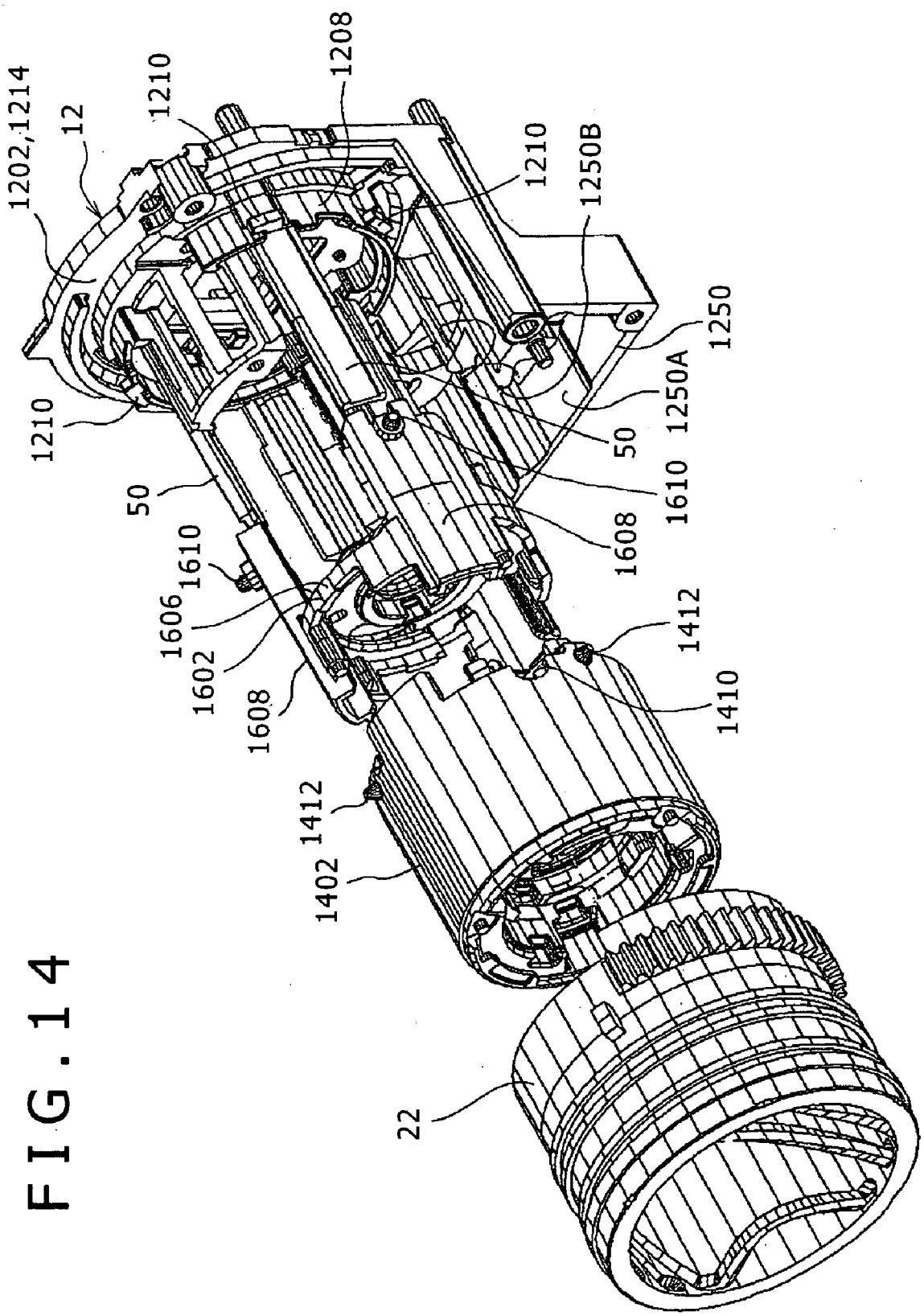
FIG. 14 is an exploded perspective view of the cam ring, the first lens holder frame, the second lens holder frame, and the base.
Figure 15:
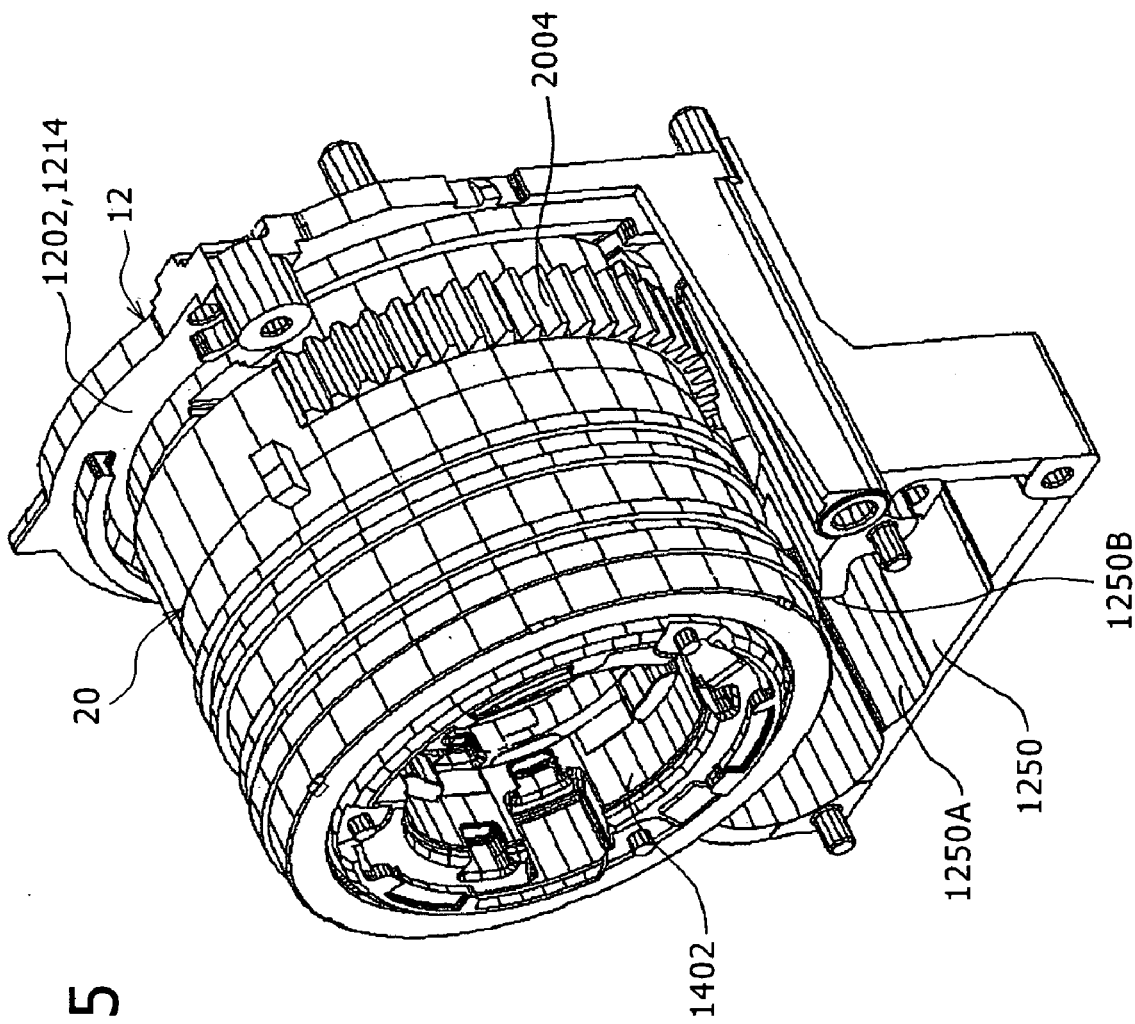
FIG. 15 is a perspective view of the cam ring, the first lens holder frame, the second lens holder frame, and the base which are assembled together.
Figure 29:
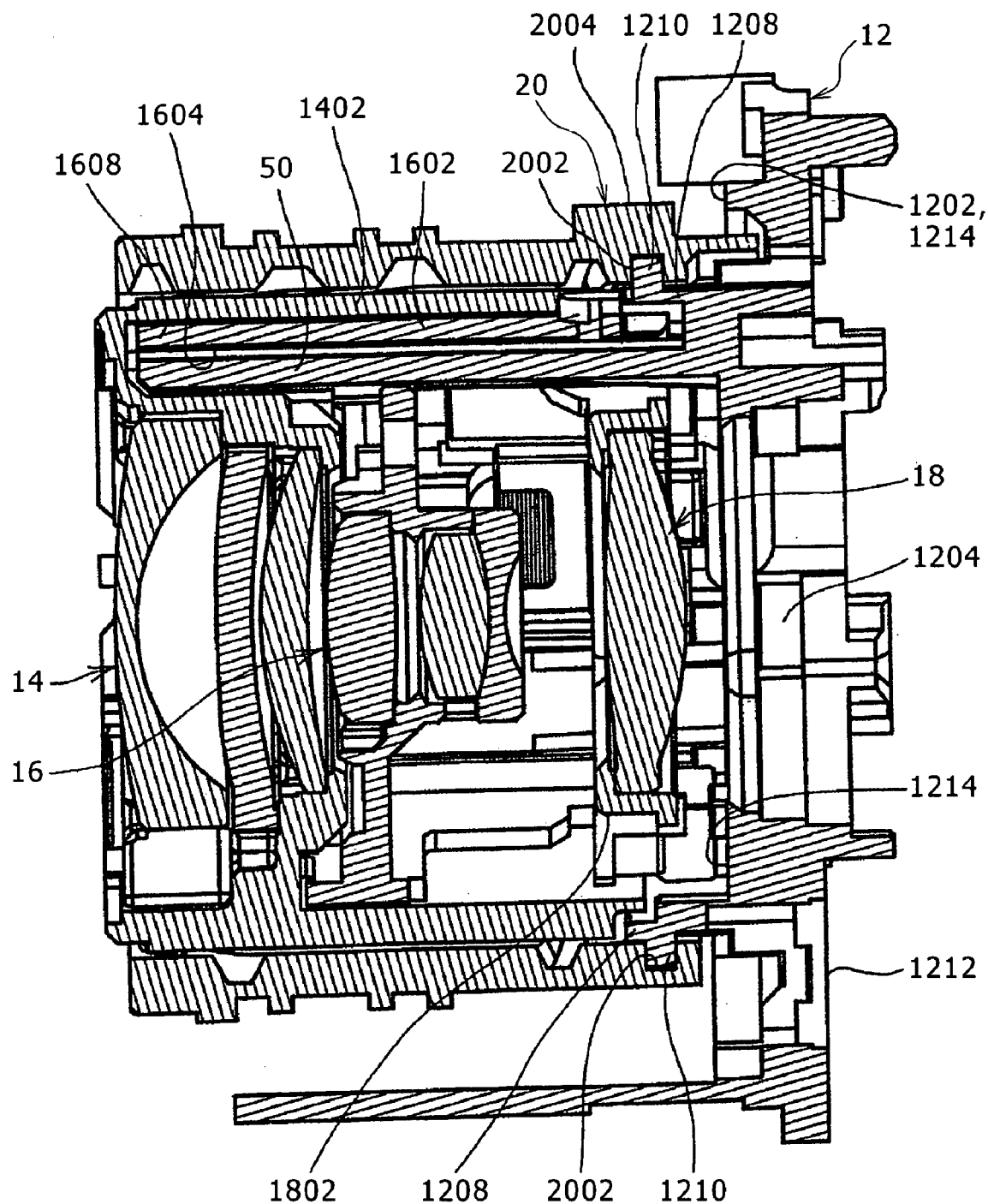
FIG. 29 is a cross-sectional view taken along line XXIX—XXIX of FIG. 28.
Figure 30:
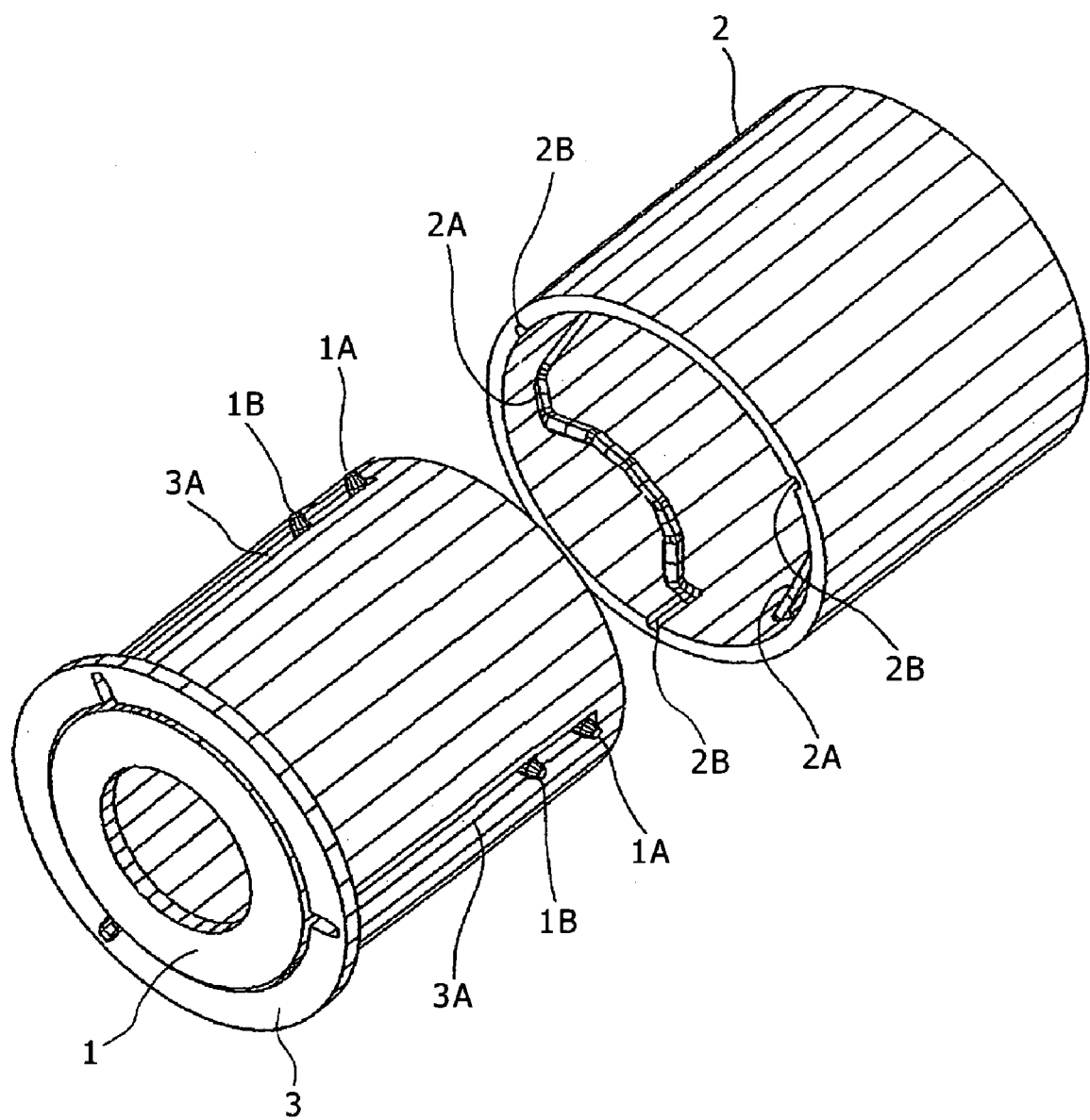
FIG. 30 is an exploded perspective view of a lens barrel in related art.

As shown in FIGS. 12 and 29, the base body 1202 has a front surface 1214 facing forwardly and having a cylindrical wall 1208 projecting forwardly and extending cylindrically around the optical axis of the image-capturing optical system 104.

Figure 19:
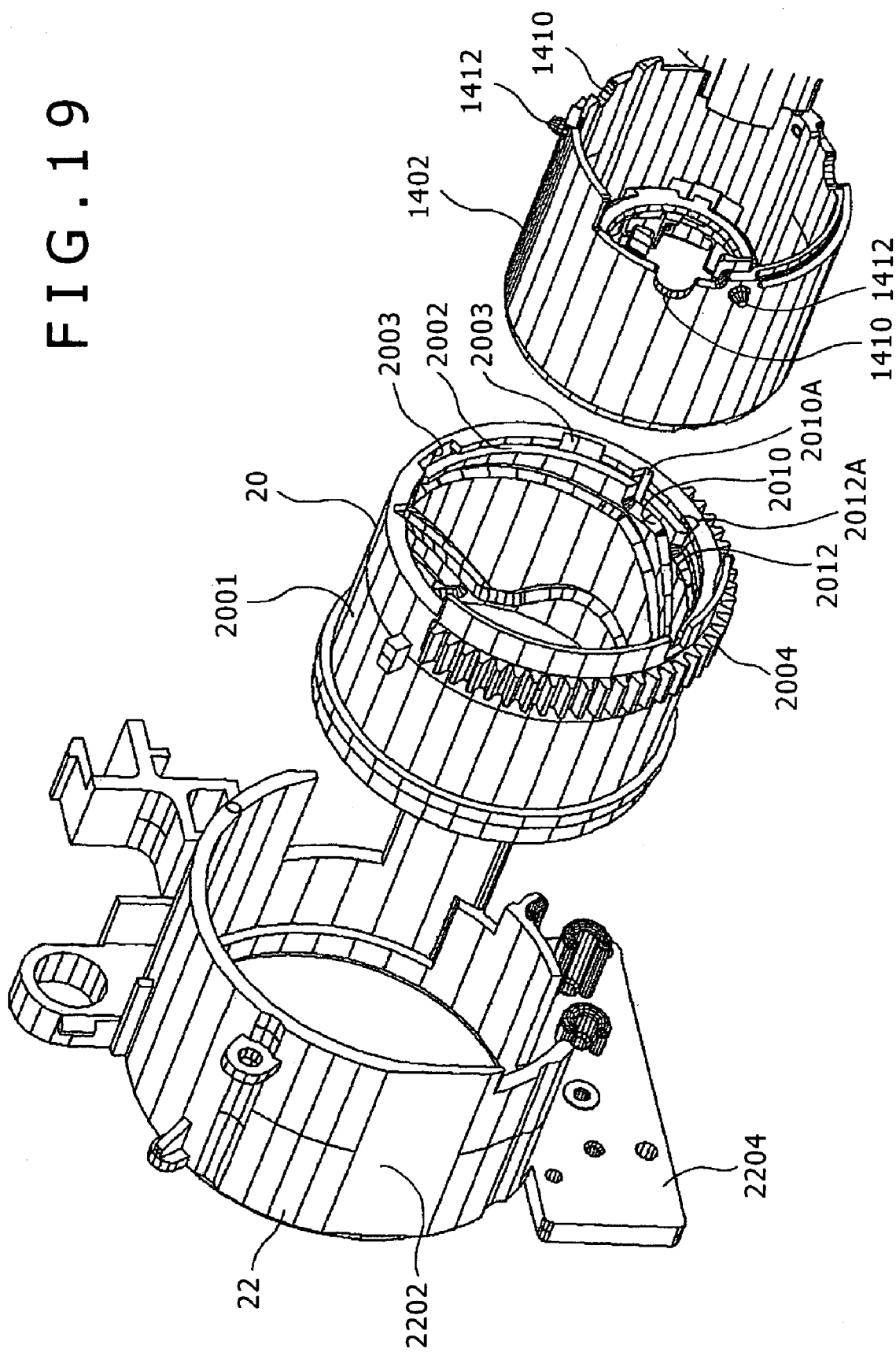
FIG. 19 is an exploded perspective view of the fixed ring, the cam ring, and the first lens holder frame of the lens barrel shown in FIG. 16.
Figure 20:
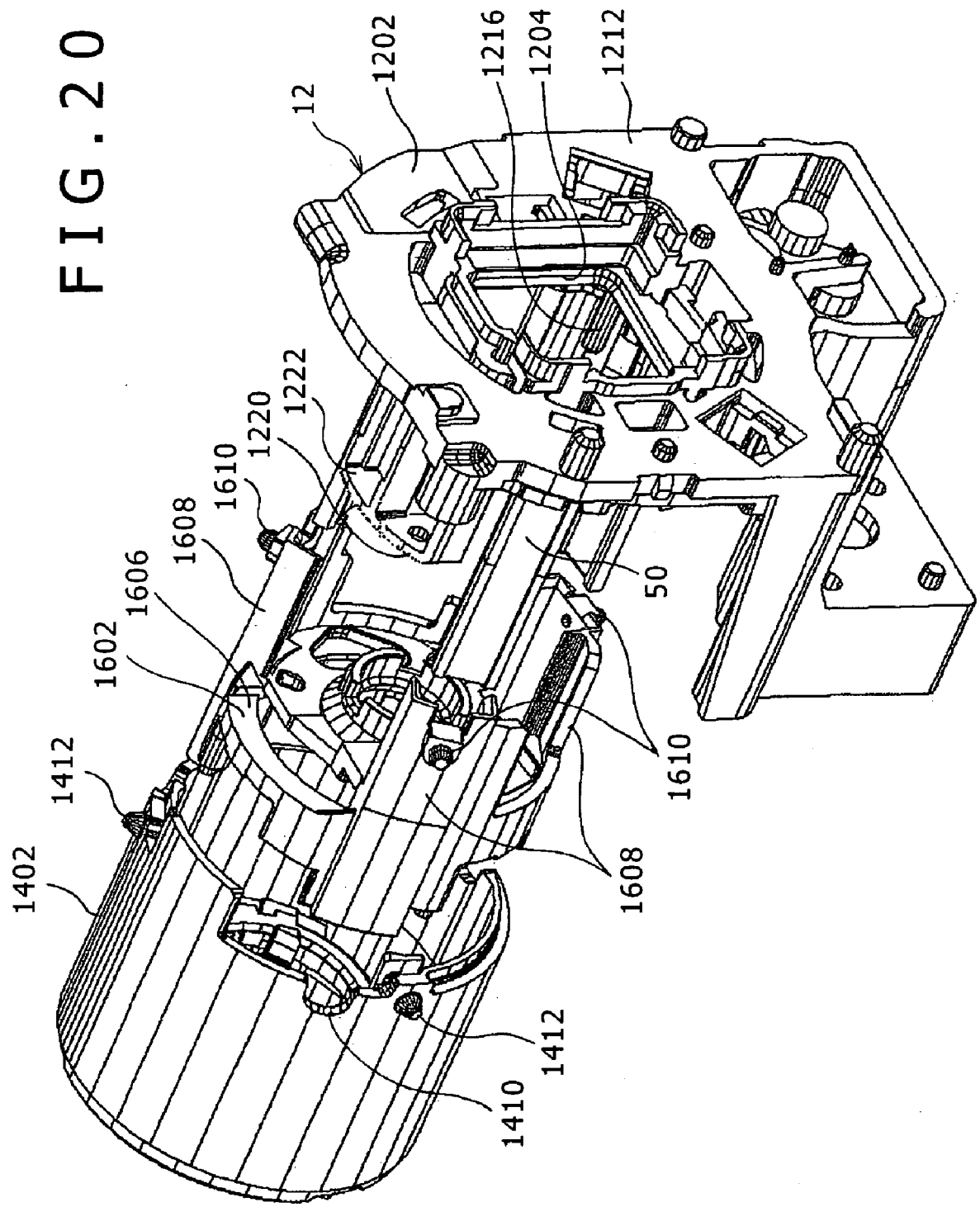
FIG. 20 is an exploded perspective view of the first lens holder frame, the second lens holder frame, and the base of the lens barrel shown in FIG. 16.

The cylindrical wall 1208 has four engaging members 1210 disposed at circumferential intervals on the outer circumferential surface thereof and extending radially outwardly. The engaging members 1210 engage in an engaging groove 2002 defined circumferentially in an inner circumferential surface of the cam ring 20, so that the cam ring 20 is rotatable in its circumferential direction with respect to the base 12 and immovable in its axial direction. As shown in FIG. 19, the cam ring 20 has open grooves 2003 defined therein which are open at its rear end and connected to the engaging groove 2002. The engaging members 1210 engage into the engaging groove 2002 when the engaging members 1210 are inserted through the respective open grooves 2003 into the engaging groove 2002.

Figure 23:
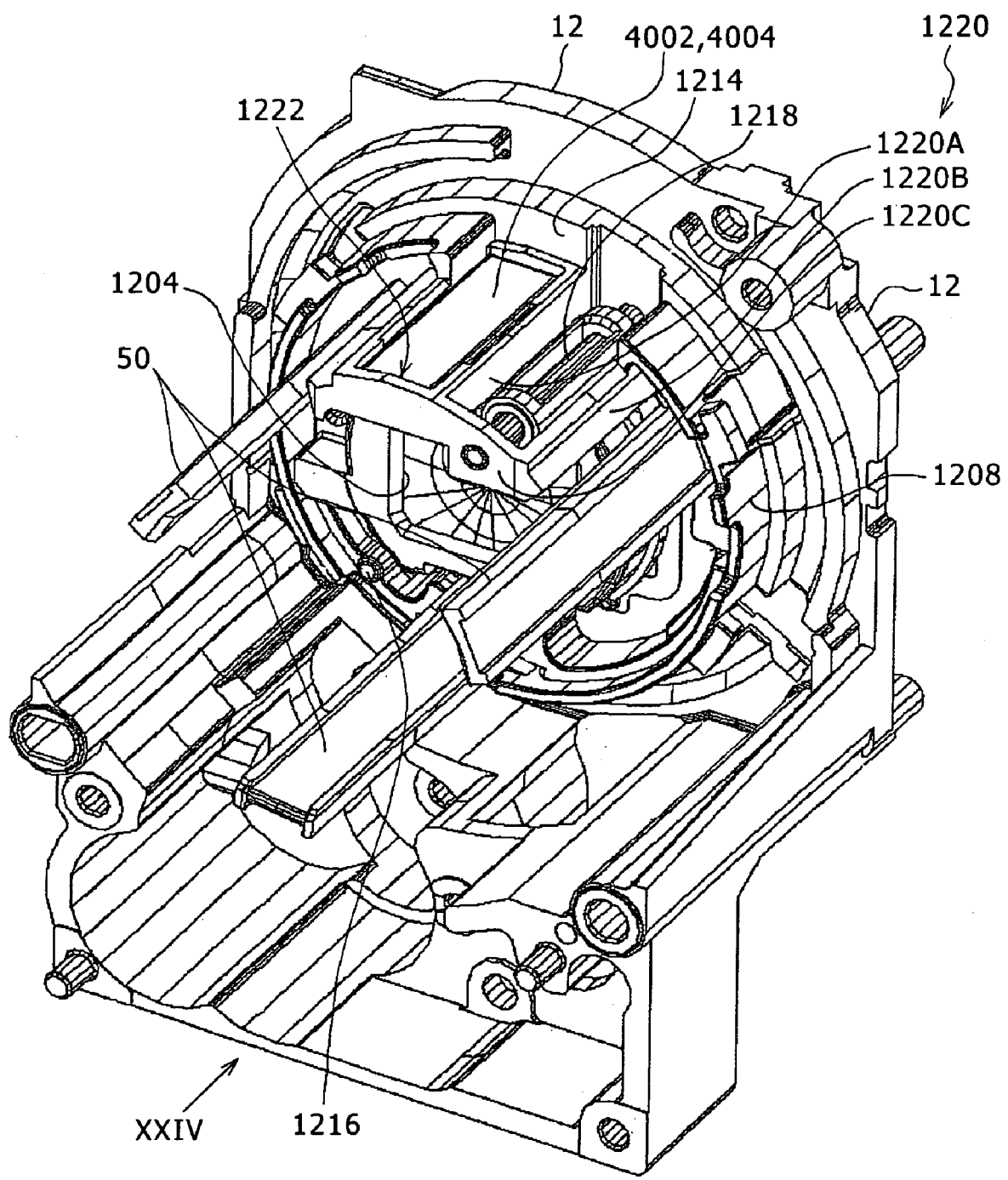
FIG. 23 is a perspective view of the third lens holder frame and the base which are assembled together.
Figure 24:
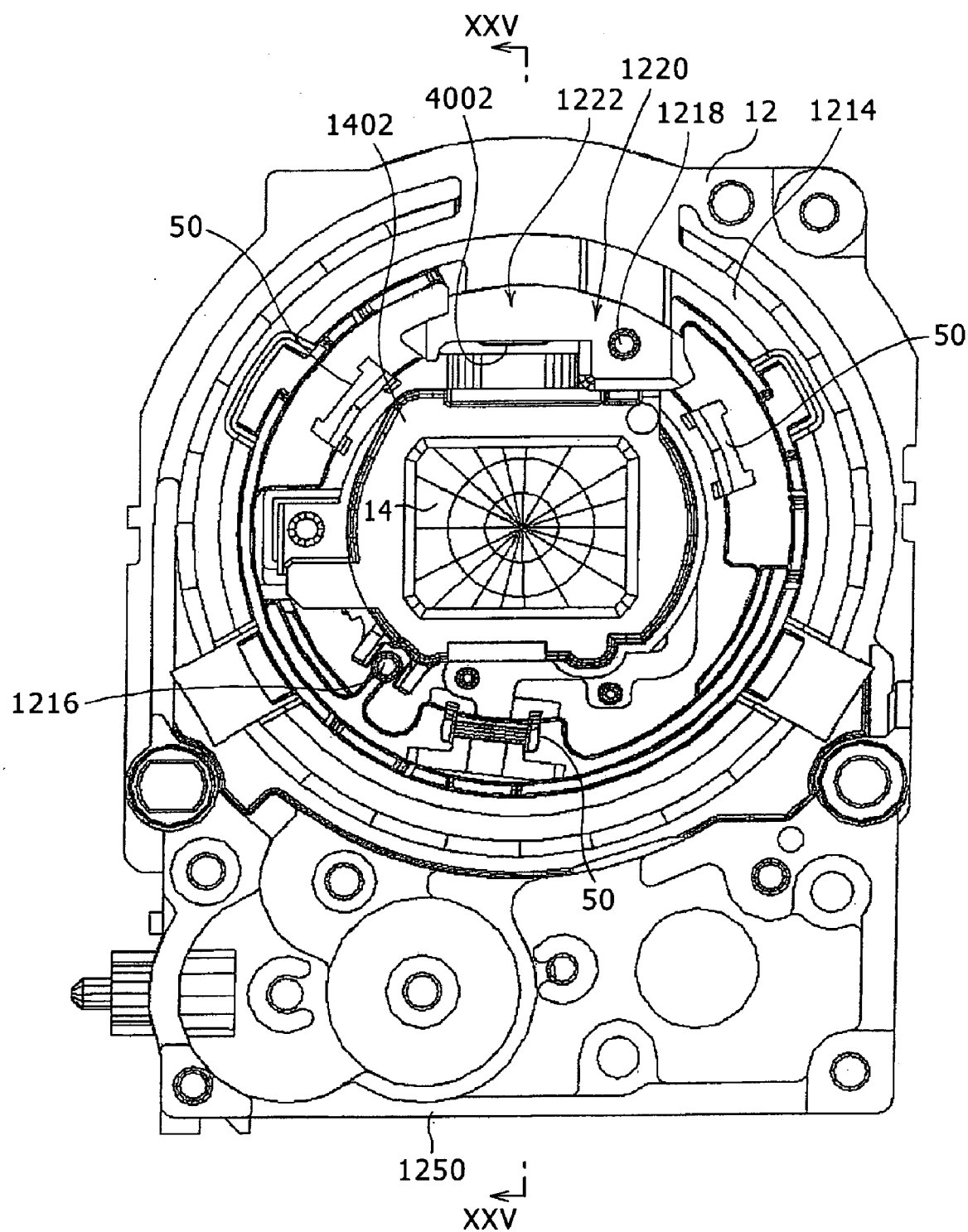
FIG. 24 is a view of the assembly shown in FIG. 23, as viewed in the direction indicated by the arrow XXIV in FIG. 23.

As shown in FIG. 23, two guide shafts 1216, 1218 for guiding the third lens holder frame 1802 toward the optical axis direction are disposed inwardly of the cylindrical wall 1208 on the front surface 1214 of the base body 1202. The guide shafts 1216, 1218 are positioned diametrically across the opening 1204, and extend parallel to the optical axis of the image-capturing optical system 104.

The guide shaft 1216 has a rear end fixed to the front surface 1214.

The guide shaft 1218 has a rear end fixed to the front surface 1214 and a front end supported by a support 1220.

The support 1220 includes first and second support walls 1220A, 1220B erected from the front surface 1214 and a first joint wall 1220C joining the front ends of the first and second support walls 1220A, 1220B. The front end of the guide shaft 1218 is fixed to the first joint wall 1220C.

As shown in FIGS. 22, 23, 24, and 25, a magnet mount 1222 is disposed on the front surface 1214 of the base body 1202 adjacent to the support 1220.

Figure 22:
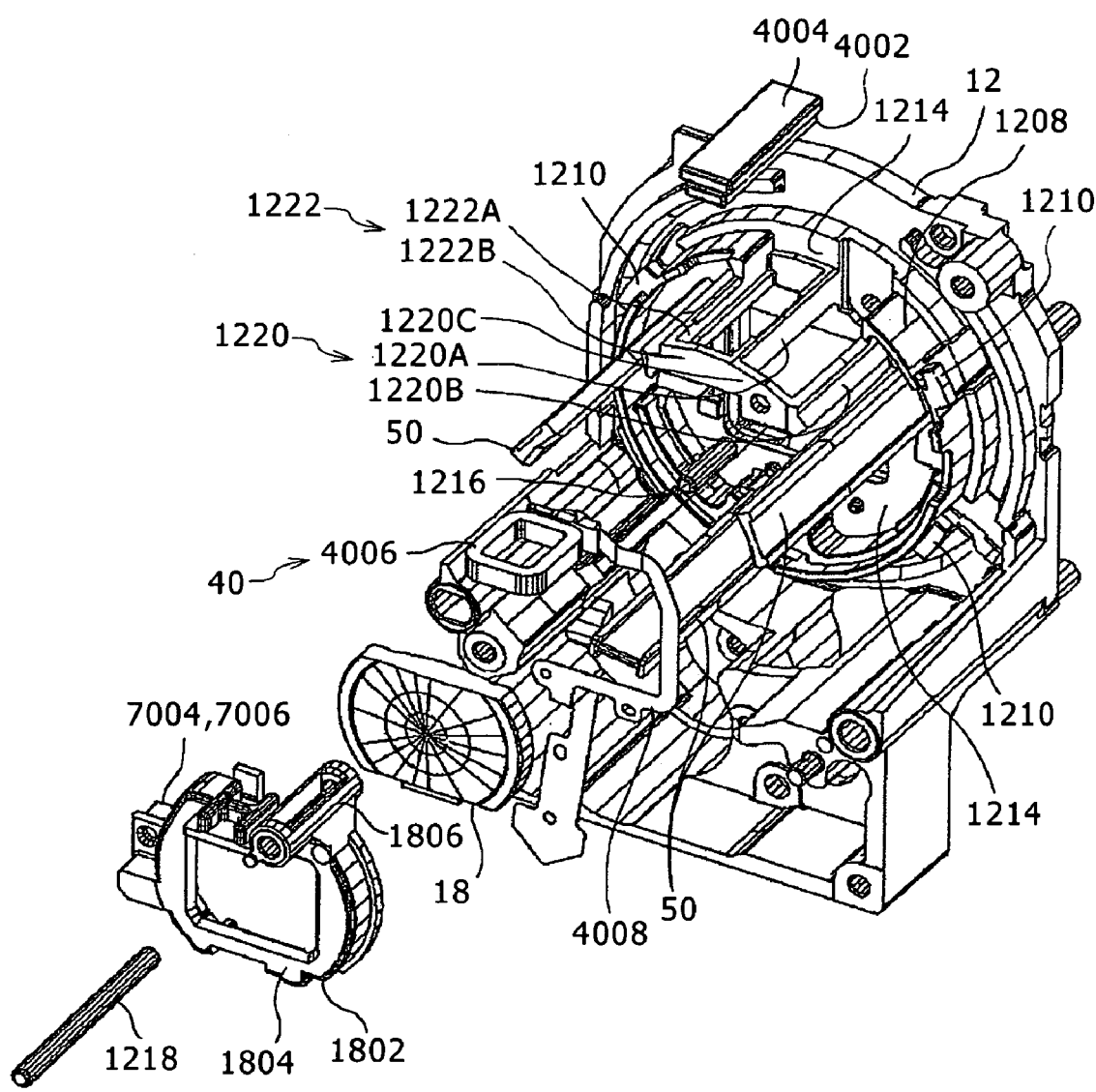
FIG. 22 is an exploded perspective view of the third lens holder frame and the base.

As shown in FIG. 22, the magnet mount 1222 is of a rectangular frame shape whose longitudinal axis lies parallel to the optical axis of the image-capturing optical system 104. Specifically, the magnet mount 1222 includes the first support wall 1220A, a third support wall 1222A erected from the front surface 1214 and spaced from the first support wall 1220A remotely from the second support wall 1220B in a direction around the optical axis, a second joint wall 1222B connected to the first joint wall 1220C and joining the front ends of the first and third support walls 1220A, 1222A, and the portion of the front surface 1214 which extends between the first and third support walls 1220A, 1222A.

Within the magnet mount 1222, there are disposed an actuating magnet 4002 in the form of a strip and a back yoke 4004 in the form of a strip which has an outer profile greater than the actuating magnet 4002 and which is mounted on one of the side surfaces of the actuating magnet 4002 across its thickness. The actuating magnet 4002 and the back yoke 4004 extend along the optical axis of the image-capturing optical system 104.

The actuating magnet 4002 has an array of first areas magnetized to one of N and S poles and second areas magnetized to the other of N and S poles, the first and second areas alternating with each other along the longitudinal axis of the actuating magnet 4002. The actuating magnet 4002 is disposed so as to face the optical axis, and the first and second areas thereof are arranged to lie parallel to lines tangential to a circle around the optical axis.

As shown in FIG. 9, three guide posts 50 are disposed on the front surface 1214 of the base body 1202 and spaced at equal intervals in the circumferential direction of the cylindrical wall 1208. The guide posts 50 extend parallel to the optical axis. Stated otherwise, the guide posts 50 are spaced at equal intervals in the circumferential direction of the cam ring 20.

In the present embodiment, the guide posts 50 are made of synthetic resin, and molded integrally with the base 12.

Figure 27:
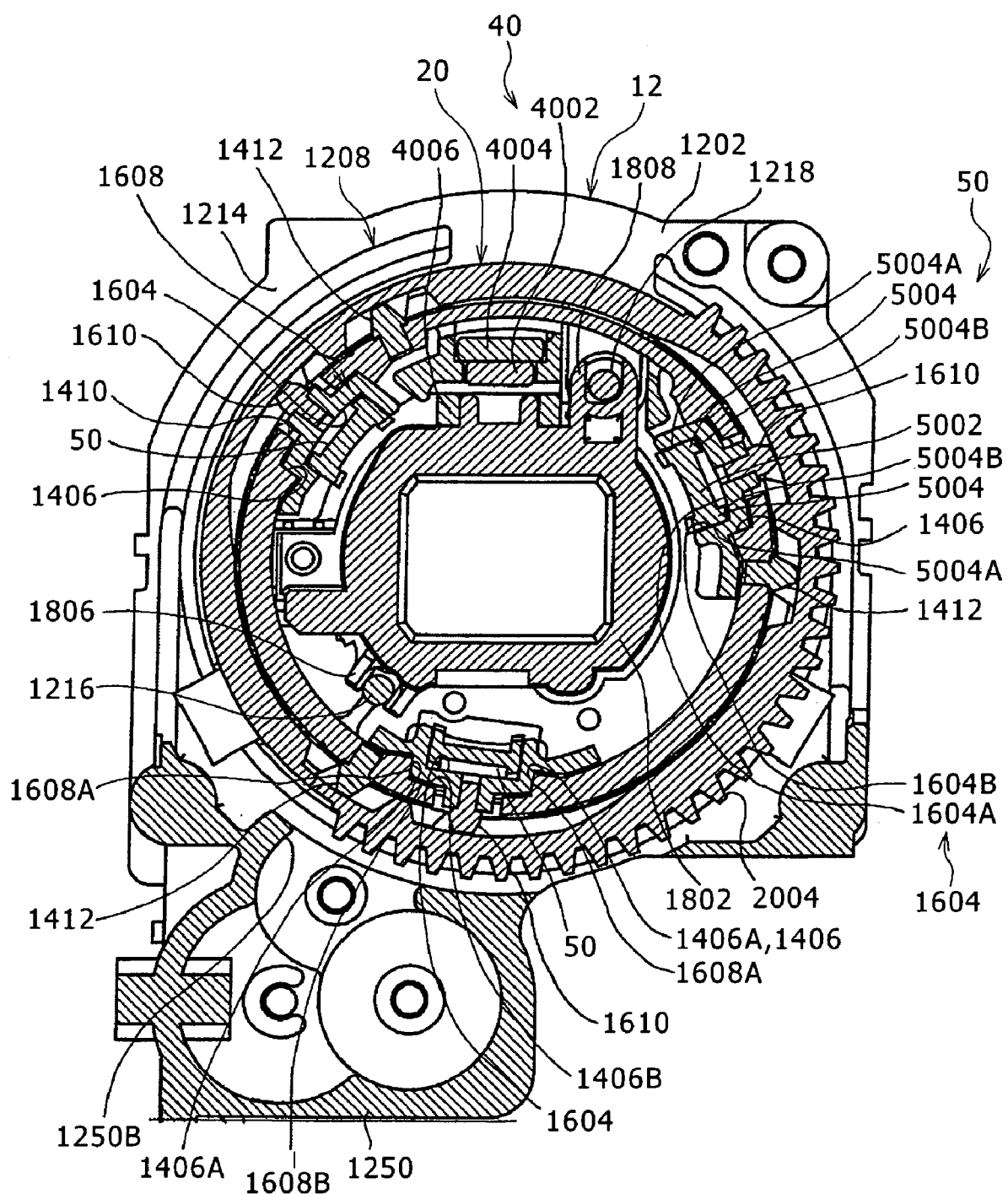
FIG. 27 is a cross-sectional view of the lens barrel, taken along a plane perpendicular to the optical axis.
Figure 28:
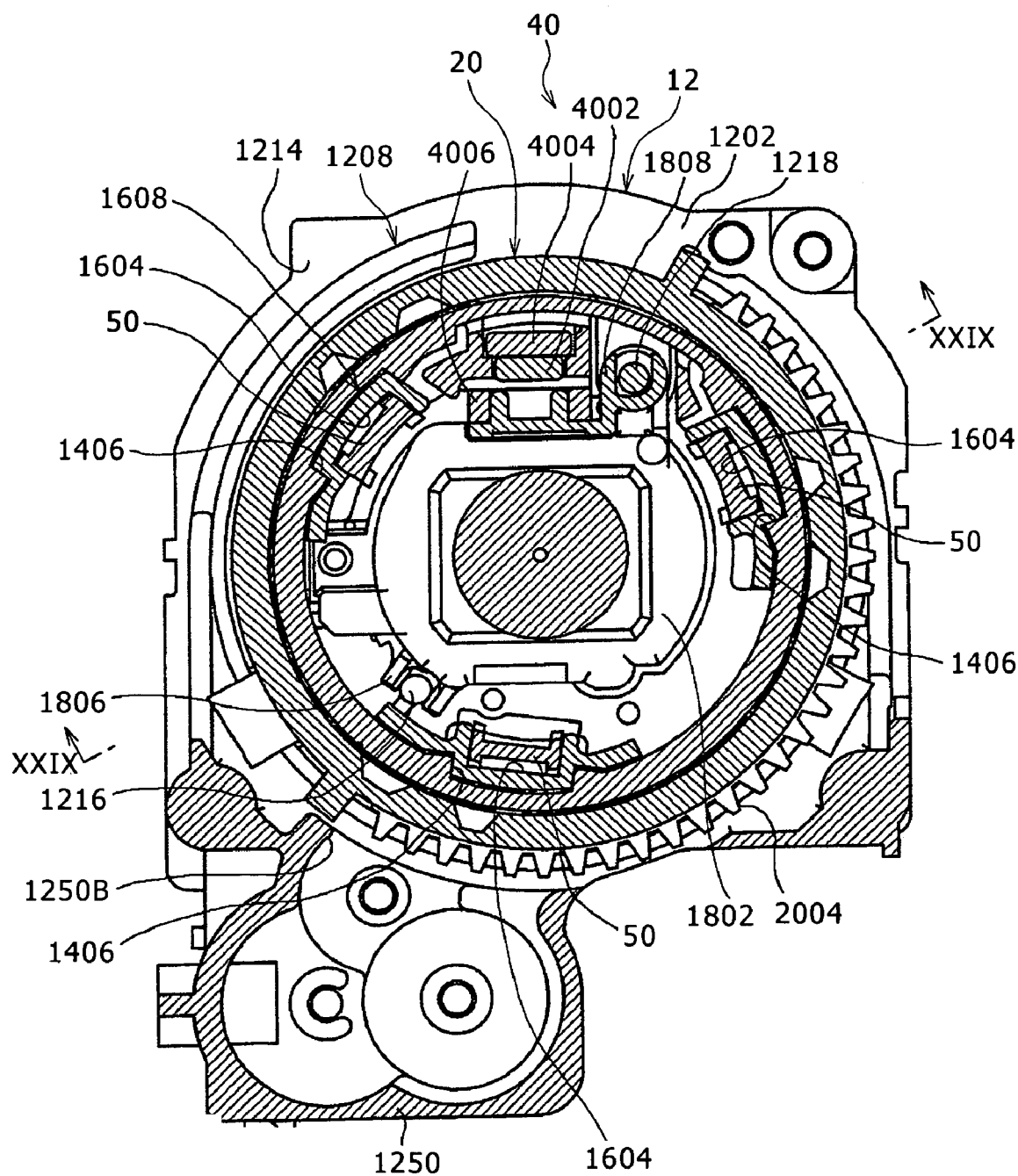
FIG. 28 is a cross-sectional view of the lens barrel, taken along a plane perpendicular to the optical axis.

As shown in FIG. 27, each of the guide posts 50 is of a I-shaped cross section having a web 5002 and a pair of flanges 5004 disposed respectively on the opposite ends of the web 5002.

The web 5002 of each of the guide posts 50 is oriented parallel to a line tangential to the portion of the cylindrical wall 1208 which is positioned radially outwardly of the guide post 50. Stated otherwise, each of the guide posts 50 is oriented parallel to a line tangential to the corresponding portion of the second lens holder frame 1602.

As shown in FIG. 8, the gear housing 1250 has a forwardly open opening 1250A and an opening 1250B which is open laterally toward the optical axis, and houses therein a speed reducer mechanism 1252 which includes a gear train. When a motor 1254 of the actuator 146 is energized, the speed reducer mechanism 1252 transmits the rotational power of the motor 1254 at a reduced speed to the cam ring 20, thereby rotating the cam ring 20.

The motor 1254 is mounted on the gear housing 1250 and has a drive gear 1256 held in mesh with an upstream end gear of the gear train of the speed reducer mechanism 1252. A downstream end gear of gear train of the speed reducer mechanism 1252 is held in mesh with a gear 2004 on the outer circumference of the cam ring 20 through the opening 1250B.

Figure 21:
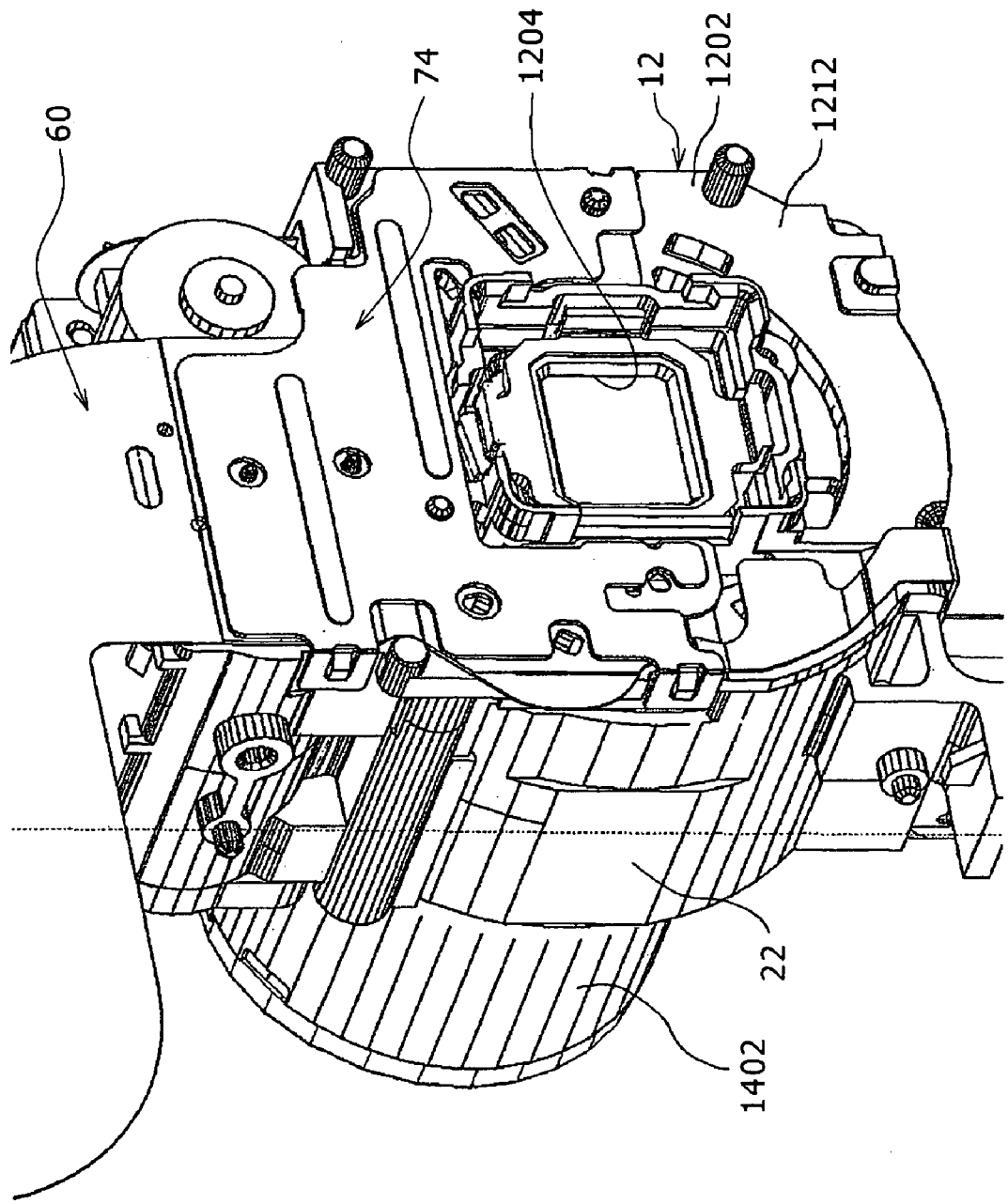
FIG. 21 is a perspective view of the fixed ring, the cam ring, the first lens holder frame, the second lens holder frame, the third lens holder frame, and the flexible board which are assembled together.

As shown in FIGS. 9 and 21, the flexible board 60 is mounted on the rear surface 1212 of the base 12. Specifically, an attachment fixture 74 is held against the rear surface of the flexible board 60, and engaging recesses 7402 defined in opposite sides of the attachment fixture 74 are placed around respective engaging teeth 1232 on opposite sides of the base 12, thereby securing the flexible board 60 to the base 12.

The image pickup apparatus 140, a Hall device 7002 for detecting the position of the third lens holder frame 1802, and other components are mounted on the flexible board 60. The flexible board 60 also has a connector which is electrically connected to a terminal of the motor 1254.

A captured image signal from the image pickup apparatus 140 is supplied through the flexible board 60 to the image processor 142. A detected signal from the Hall device 7002 is supplied through the flexible board 60 to the controller 148. A drive signal from the controller 148 is supplied through the flexible board 60 to the motor 1254.

As shown in FIG. 17, the Hall device 7002 is disposed in an attachment recess 1240 that is defined in the rear surface 1212 of the base 12.

As shown in FIGS. 22 and 27, the third lens holder frame 1802 has a frame body 1804 holding the third lens group 18.

The frame body 1804 has two bearings 1806, 1808 positioned diametrically across the optical axis. The guide shafts 1216, 1218 extend respectively through the bearings 1806, 1808. Consequently, the third lens holder frame 1802 is movable along the optical axis, but nonrotatable around the optical axis.

A coil 4006 is fixed by an adhesive or the like to a portion of the frame body 1804 which faces the magnet 4002. The coil 4006 is wound around an axis perpendicular to the surface of the magnet 4002 which faces the third lens holder frame 1802, i.e., an axis perpendicular to the optical axis. The coil 4006 is electrically connected to the flexible board 60 through a coil flexible board 4008 (see FIG. 18). A drive signal from the controller 148 is supplied through the flexible boards 60, 4008 to the coil 4006.

In the present embodiment, the magnet 4002, the back yoke 4004, and the join 4006 jointly make up a linear motor 40. When the coil 4006 is supplied with a drive current from the controller 148, the coil 4006 generates a magnetic field, which acts with the magnetic field generated by the first and second areas of the magnet 4002 to produce a drive force for moving the third lens holder frame 1802 forwardly or rearwardly along the optical axis.

As shown in FIGS. 9 and 22, a magnet 7004 is fixed by an adhesive or the like to a portion of the frame body 1804 which faces the Hall device 7002.

In the present embodiment, the Hall device 7002 detects the strength (flux density) of the magnetic force of the magnet 7004, and supplies a detected signal to the controller 148, which detects the position of the third lens holder frame 1802 along the optical axis. The Hall device 7002, the magnet 7004, and the controller 148 jointly make up a position detecting mechanism 70.

Figure 10:
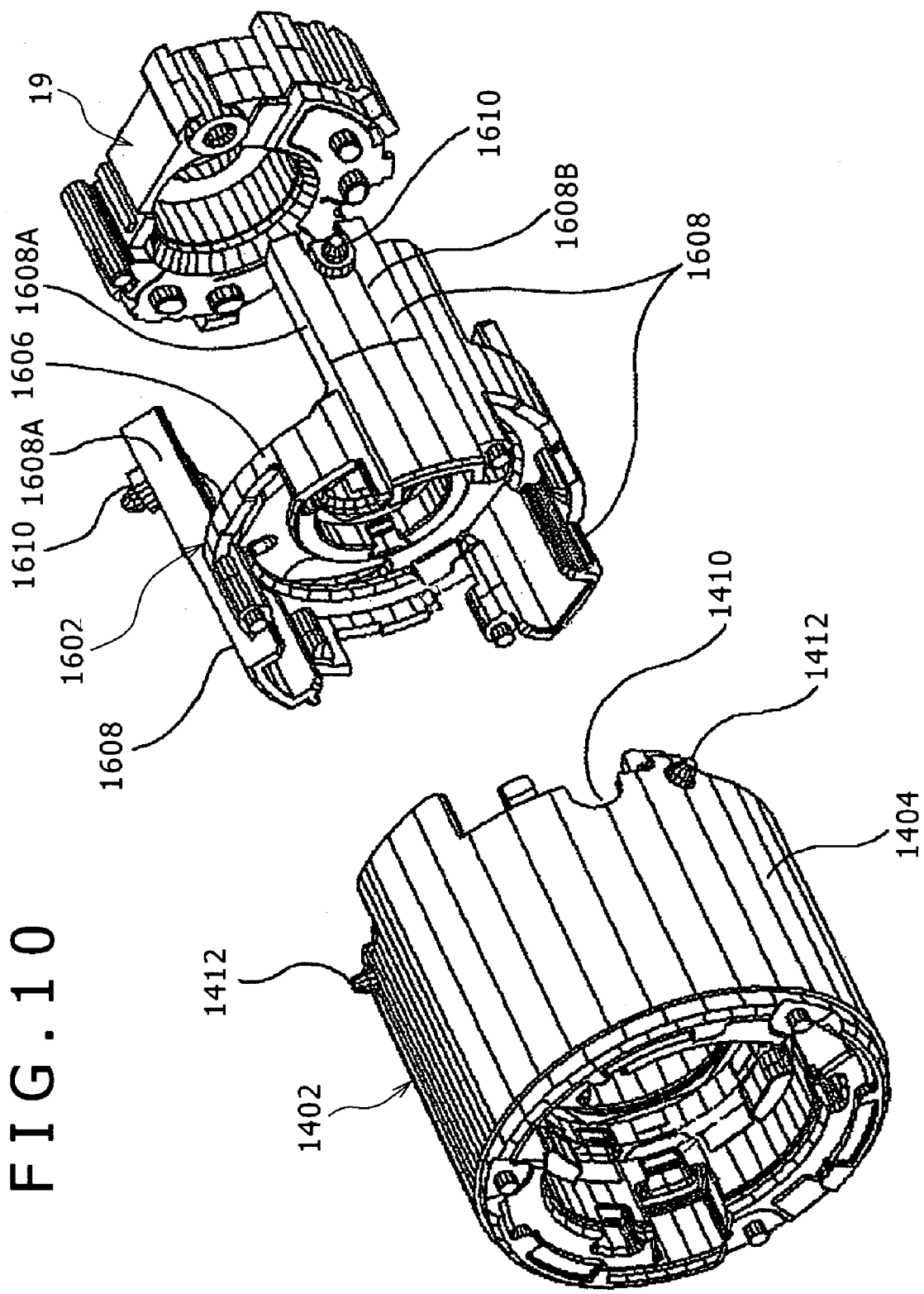
FIG. 10 is an exploded perspective view of a first lens holder frame, a second lens holder frame, and an automatic exposure unit of the lens barrel shown in FIG. 8.
Figure 18:
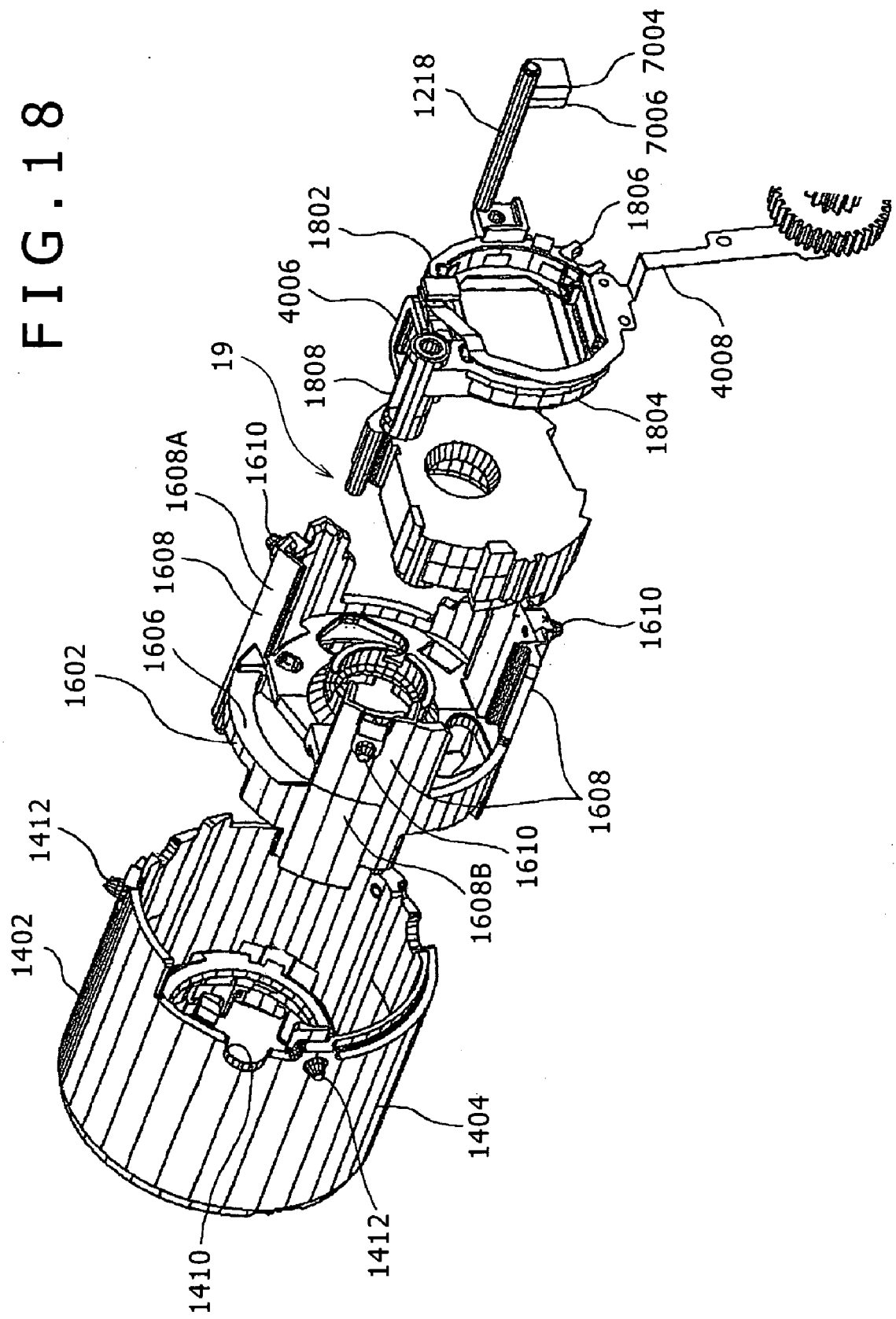
FIG. 18 is an exploded perspective view of the first lens holder frame, the second lens holder frame, the automatic exposure unit, and the third lens holder frame of the lens barrel shown in FIG. 16.

As shown in FIGS. 10 and 18, the second lens holder frame 1602 includes an annular plate 1606 holding the second lens group 16 and three guides 1608 extending axially from an outer circumferential portion of the annular plate 1606 and spaced at equal intervals in the circumferential direction of the annular plate 1606.

Guide grooves 1604 are defined in respective portions of the annular plate 1606 which are radially inwardly faced by the guides 1608, i.e., in respective inner circumferential portions of the second lend holder frame 1602.

As shown in FIG. 27, each of the guide grooves 1604 is defined by two confronting side surfaces 1604A and a bottom surface 1604B interconnecting the inner ends of the side surfaces 1604A, and is open radially inwardly of the second lend holder frame 1602. The guide grooves 1604 extend parallel to the optical axis.

The guide posts 50 engage respectively in the guide grooves 1604, so that the second lens holder frame 1602 is nonrotatably, but axially movably (along the optical axis) supported by the three guide posts 50.

More specifically, the flanges 5004 on the opposite ends of each of the guide posts 50 have respective outer surfaces 5004A engaging the respective side surfaces 1604A of the corresponding guide groove 1604 in the second lens holder frame 1602, preventing the second lens holder frame 1602 from moving circumferentially. The flanges 5004 have respective end faces 5004B engaging the bottom surface 1604B of the corresponding guide groove 1604, preventing the second lens holder frame 1602 from moving radially.

Each of the guides 1608 has a pair of side surfaces 1608A on both sides of a direction perpendicular to the direction in which the guide 1608 extends, and an outer surface 1608B facing radially outwardly between the side surfaces 1608A.

Second cam pins 1610 are mounted on respective portions of the second lens holder frame 1602 which face radially outwardly of the guide grooves 1604, i.e., portions on the guides 1608, at positions near the rear ends of the guides 1608. The second cam pins 1610 project radially outwardly.

As shown in FIG. 18, the second cam pins 1610 on the respective guides 1608 extend through respective recesses 1410 defined in an outer circumferential wall of the first lens holder frame 1402 and project radially outwardly from the outer circumferential wall of the first lens holder frame 1402. As shown in FIG. 19, the second cam pins 1610 engage in a second cam groove 2012 defined in the cam ring 20. When the cam ring 20 rotates, the second cam pins 1610 are guided by the second cam groove 2012 to cause the second lens holder frame 1602 to move along the optical axis.

As shown in FIGS. 10 and 18, the automatic exposure unit 19 is disposed in a rear portion of the second lens holder frame 1602, and is movable in unison with the second lens holder frame 1602 along the optical axis.

The automatic exposure unit 19 has a shutter function and a variable diaphragm function, and is electrically connected to the flexible board 60 through a flexible board (not shown). When a drive signal from the controller 148 is supplied through the flexible board 60 and the non-illustrated flexible board to the automatic exposure unit 19, the automatic exposure unit 19 controls its shutter and variable diaphragm operation.

As shown in FIGS. 10 and 18, the first lens holder frame 1402 has a tubular body 1404 holding the first lens group 14 and also has axial guide grooves 1406 (see FIG. 27) defined in respective portions of the tubular body 1404 which face radially inwardly, i.e., in an inner circumferential surface of the first lens holder frame 1402. The guides 1608 of the second lens holder frame 1602 engage respectively in the guide grooves 1406.

As shown in FIG. 27, each of the guide grooves 1406 is defined by two confronting side surfaces 1406A and a bottom surface 1406B interconnecting the inner ends of the side surfaces 1406A, and is open radially inwardly of the first lend holder frame 1402.

The guides 1608 of the second lens holder frame 1602 engage respectively in the guide grooves 1406 of the first lens holder frame 1402, which is nonrotatably, but axially movably supported by the three guides 1608.

More specifically, the opposite side surfaces 1608A of each of the guides 1608 engage the respective side surfaces 1406A of the corresponding guide groove 1406, preventing the first lens holder frame 1402 from moving circumferentially. The outer surface 1608B of the guide 1608 engages the bottom surface 1406B of the corresponding guide groove 1406, preventing the first lens holder frame 1402 from moving radially.

Three first cam pins 1412 are mounted on respective portions of the tubular body 1404 which face radially outwardly, i.e., on an outer circumferential surface of the first lens holder frame 1402, at circumferentially equally spaced positions near the rear end of the tubular body 1404. The first cam pins 1412 project radially outwardly.

As shown in FIG. 19, the first cam pins 1412 engage in a first cam groove 2010 defined in an inner circumferential surface of the cam ring 20. When the cam ring 20 rotates, the first cam pins 1412 are guided by the first cam groove 2010 to cause the first lens holder frame 1402 to move along the optical axis.

When the lens barrel 10 is in the collapsed state as shown in FIG. 4A, the second cam pins 1610 of the second lens holder frame 1602 are positioned in the respective recesses 1410 in the first lens holder frame 1402, and the first cam pins 1412 of the first lens holder frame 1402 and the second cam pins 1610 of the second lens holder frame 1602 are positioned in substantial axial alignment with each other across the optical axis, and spaced from each other in the circumferential direction.

Figure 11:
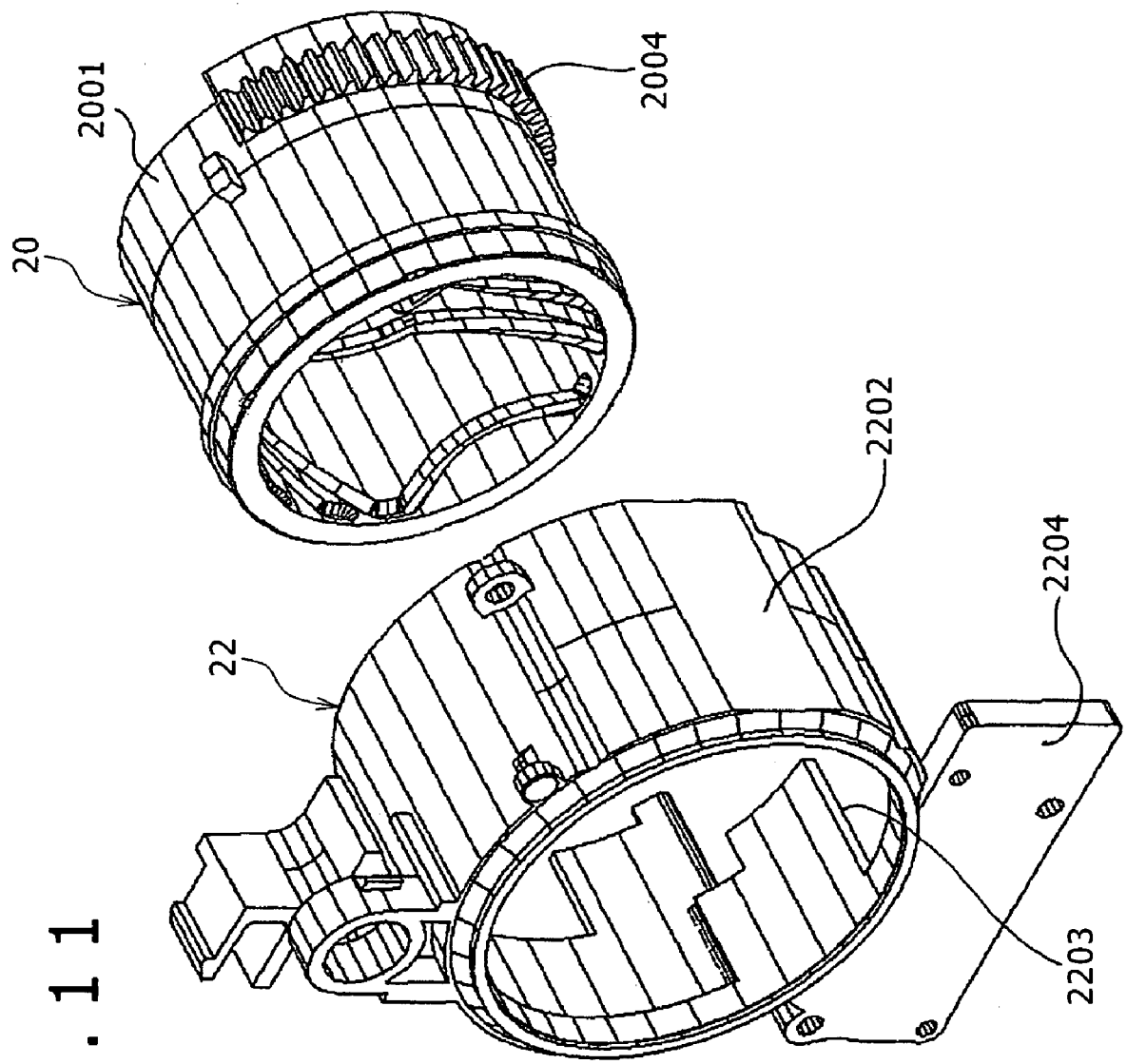
FIG. 11 is an exploded perspective view of a fixed ring and a cam ring of the lens barrel shown in FIG. 8.

As shown in FIGS. 11 and 19, the cam ring 20 has a tubular body 2001, and the gear 2004 is disposed on an outer circumferential surface of the tubular body 2001 near its rear end.

The first cam groove 2010 and the second cam groove 2012 are defined circumferentially in an inner circumferential surface of the tubular body 2001. First and second open grooves 2010A, 2012A are defined in the rear end of the inner circumferential surface of the tubular body 2001 and connected respectively to the first cam groove 2010 and the second cam groove 2012.

The first cam pins 1412 of the first lens holder frame 1402 engage into the first cam groove 2010 when the first cam pins 1412 are inserted through the respective first open grooves 2010A into the first cam groove 2010.

The second cam pins 1610 of the second lens holder frame 1602 engage into the second cam groove 2012 when the second cam pins 1610 are inserted through the respective second open grooves 2012A into the second cam groove 2012.

As shown in FIGS. 11 and 19, the fixed ring 22 includes a tubular body 2202 and a lid 2204 mounted on the tubular body 2202 near a front end thereof.

The tubular body 2202 has an inside diameter greater than the outside diameter of the cylindrical wall 1208 of the base 12, and has an opening 2203 defined therein which communicates with the opening 1250A in the gear housing 1250.

The downstream end gear of gear train of the speed reducer mechanism 1252 housed in the gear housing 1250 is held in mesh with the gear 2004 of the cam ring 20 through the opening 2203.

The tubular body 2202 of the fixed ring 22 houses therein the first lens holder frame 1402, the second lens holder frame 1602, the third lens holder frame 1802, and the cam ring 20. With the opening 1250A in the gear housing 1250 being closed by the lid 2204, the tubular body 2202 has its rear end fastened to the front surface 1214 of the base 12 by screws or the like.

Operation and advantages of the lens barrel 10 will be described below.

The three guide posts 50 project from the base 12 parallel to the optical axis and are spaced at equal intervals in the circumferential direction of the cam ring 20. The inner circumferential surface of the second lens holder frame 1602 engages the guide posts 50, so that the second lens holder frame 1602 is nonrotatably, but axially movably supported by the guide posts 50. Components of the image pickup device, including the guide shafts 1216, 1218 and the magnet 4002, can thus be disposed in spaces between the guide posts 50 on a circle passing through the guide posts 50 around the optical axis, as shown in FIG. 27. Therefore, the diametrical dimension of the lens barrel 10 and hence the size of the image pickup apparatus 100 may be smaller than if the linear guide ring is disposed between the outer circumferential surfaces of the first and second lens holder frames 1402, 1602 and the inner circumferential surface of the cam ring 20 as with the conventional arrangement.

Since the first lens holder frame 1402 is nonrotatably, but axially movably supported on the outer circumferential surface of the second lens holder frame 1602, the diametrical dimension of the lens barrel 10 and hence the size of the image pickup apparatus 100 may be reduced.

For assembling the first and second lens holder frames 1402, 1602 onto the base 12, the guide grooves 1604 in the second lens holder frame 1602 are fitted over the respective guide posts 50 of the base 12, and the second lens holder frame 1602 is displaced along the guide posts 50 toward the base 12. Then, the guide grooves 1406 in the first lens holder frame 1402 are fitted over the respective guides 1608 of the second lens holder frame 1602, and the first lens holder frame 1402 is displaced along the guides 1608 toward the base 12. Therefore, the first and second lens holder frames 1402, 1602 can easily be assembled onto the base 12.

While the lens barrel 10 is in the collapsed state, the first cam pins 1412 of the first lens holder frame 1402 and the second cam pins 1610 of the second lens holder frame 1602 are positioned in substantial axial alignment with each other across the optical axis, and circumferentially spaced from each other. Consequently, the first and second cam pins 1412, 1610 can simultaneously be inserted through the first and second open grooves 2010A, 2012A in the cam ring 20 into the first and second cam grooves 2010, 2012. The assembling process is simpler than if one of the cam pins is inserted into the cam groove, thereafter the cam ring 20 is rotated by one revolution, and then the other cam pin is inserted into the cam groove as with the conventional arrangement.

Each of the guide posts 50 is of the I-shaped cross section having the web 5002 and the flanges 5004 disposed respectively on the opposite ends of the web 5002. Accordingly, the guide posts 50 have a required level of mechanical strength and take up a reduced space.

The outer surfaces 5004A of the flanges 5004 on the opposite ends of each of the guide posts 50 engage the respective side surfaces 1604A of the corresponding guide groove 1604 in the second lens holder frame 1602, and the end faces 5004B of the flanges 5004 engage the bottom surface 1604B of the corresponding guide groove 1604. Therefore, dead spaces are present between the webs 5002 and the bottom surfaces 1604B of the guide grooves 1604. When the second cam pins 1610 are pressed into the portions of the second lens holder frame 1602 which face radially outwardly of the guide grooves 1604, and the second cam pins 1610 thus pressed have their leading ends projecting from the inner circumferential surface of the second lens holder frame 1602, the projecting leading ends of the second cam pins 1610 are placed in the dead spaces. Therefore, the dead spaces in the guide posts 50 are effectively utilized to reduce the diametrical dimension of the lens barrel 10.

Though the three guide posts 50 have been illustrated in the illustrated embodiment, two guide posts 50 or four or more guide posts 50 may be employed.

The lens barrel 10 according to the illustrated embodiment has the first lens holder frame 1402, the second lens holder frame 1602, and the third lens holder frame 1802. However, the principles of the present invention are also applicable to a lens barrel having a single lens holder frame.

The image pickup apparatus has been illustrated as being a digital still camera in the above embodiment. However, the principles of the present invention are also any of various other image pickup apparatuses including a video camera.

Although a certain preferred embodiment of the present invention has been shown and described in detail, it should be understood that various changes and modifications may be made therein without departing from the scope of the appended claims.

What is claimed is:

1. A collapsible lens barrel comprising:
   a base;
   a cam ring rotatably, but axially immovably mounted on said base;
   a cam groove defined in an inner circumferential surface of said cam ring and extending circumferentially;
   a lens holder frame nonrotatably, but axially movably disposed radially inwardly of said cam ring, and holding a lens assembly; and
   a cam pin projecting from an outer circumferential surface of said lens holder frame and engaging in said cam groove;
   wherein when said cam ring rotates, said cam pin is guided by said cam groove to cause said lens holder frame to move axially;
   said base having at least two guide posts projecting axially therefrom and disposed at spaced intervals in a circumferential direction of said cam ring; and
   said lens holder frame having guide grooves defined in an inner circumferential surface thereof, said guide posts engaging in said guide grooves, respectively, whereby said lens holder frame is nonrotatably, but axially movably supported by said guide posts.

2. A collapsible lens barrel comprising:
   a base;
   a cam ring rotatably, but axially immovably mounted on said base;
   a cam groove defined in an inner circumferential surface of said cam ring and extending circumferentially;
   a first lens holder frame nonrotatably, but axially movably disposed radially inwardly of said cam ring, and holding a first lens assembly;
   a second lens holder frame nonrotatably, but axially movably disposed radially inwardly of said first lens holder frame, and holding a second lens assembly;
   a first cam pin projecting from an outer circumferential surface of said first lens holder frame and engaging in said cam groove;
   a second cam pin extending from an outer circumferential surface of said second lens holder frame through the outer circumferential surface of said first lens holder frame, projecting from the outer circumferential surface of said first lens holder frame, and engaging in said cam groove;
   wherein when said cam ring rotates, said first cam pin and said second cam pin are guided by said cam groove to cause said first lens holder frame and said second lens holder frame to move individually axially;
   said base having at least two guide posts projecting axially therefrom and disposed at spaced intervals in a circumferential direction of said cam ring;
   said second lens holder frame having guide grooves defined in an inner circumferential surface thereof, said guide posts engaging in said guide grooves, respectively, whereby said second lens holder frame is nonrotatably, but axially movably supported by said guide posts; and
   said first lens holder frame being nonrotatably, but axially movably supported on the outer circumferential surface of said second lens holder frame.

3. The collapsible lens barrel according to claim 1, wherein said guide grooves are open radially inwardly of said lens holder frame.

4. The collapsible lens barrel according to claim 2, wherein said guide grooves are open radially inwardly of said second lens holder frame.

5. The collapsible lens barrel according to claim 1, wherein each of said guide posts is of a I-shaped cross section having a web and a pair of flanges disposed respectively on the opposite ends of said web, said web being is oriented parallel to a line tangential to the portion of said lens holder frame which is positioned radially outwardly of the guide post.

6. The collapsible lens barrel according to claim 2, wherein each of said guide posts is of a I-shaped cross section having a web and a pair of flanges disposed respectively on the opposite ends of said web, said web being is oriented parallel to a line tangential to the portion of said second lens holder frame which is positioned radially outwardly of the guide post.

7. The collapsible lens barrel according to claim 1, wherein each of said guide grooves is defined by two confronting side surfaces and a bottom surface interconnecting inner ends of said side surfaces, and is open radially inwardly of said lens holder frame, and each of said guide posts is of a I-shaped cross section having a web and a pair of flanges disposed respectively on the opposite ends of said web, said web being is oriented parallel to a line tangential to the portion of said lens holder frame which is positioned radially outwardly of the guide post, and wherein said flanges have respective outer surfaces engaging the side surfaces of said guide grooves to prevent said lens holder frame from moving circumferentially, and said flanges have respective end faces engaging the bottom surfaces of said guide grooves to prevent said lens holder frame from moving radially.

8. The collapsible lens barrel according to claim 2, wherein each of said guide grooves is defined by two confronting side surfaces and a bottom surface interconnecting inner ends of said side surfaces, and is open radially inwardly of said second lens holder frame, and each of said guide posts is of a I-shaped cross section having a web and a pair of flanges disposed respectively on the opposite ends of said web, said web being is oriented parallel to a line tangential to the portion of said second lens holder frame which is positioned radially outwardly of the guide post, and wherein said flanges have respective outer surfaces engaging the side surfaces of said guide grooves to prevent said second lens holder frame from moving circumferentially, and said flanges have respective end faces engaging the bottom surfaces of said guide grooves to prevent said second lens holder frame from moving radially.

9. The collapsible lens barrel according to claim 2, wherein each of said guide posts is of a I-shaped cross section having a web and a pair of flanges disposed respectively on the opposite ends of said web, said web being is oriented parallel to a line tangential to the portion of said second lens holder frame which is positioned radially outwardly of the guide post, and wherein said second cam pin is disposed on the portion of said second lens holder frame which is positioned radially outwardly of said guide grooves.

10. The collapsible lens barrel according to claim 2, wherein each of said guide grooves is defined by two confronting side surfaces and a bottom surface interconnecting inner ends of said side surfaces, and is open radially inwardly of said second lens holder frame, and each of said guide posts is of a I-shaped cross section having a web and a pair of flanges disposed respectively on the opposite ends of said web, said web being is oriented parallel to a line tangential to the portion of said second lens holder frame which is positioned radially outwardly of the guide post, wherein said flanges have respective outer surfaces engaging the side surfaces of said guide grooves to prevent said second lens holder frame from moving circumferentially, and said flanges have respective end faces engaging the bottom surfaces of said guide grooves to prevent said second lens holder frame from moving radially, and wherein said second cam pin is disposed on the portion of said second lens holder frame which is positioned radially outwardly of said guide grooves, and when said lens barrel is in a most contracted collapsed state, the first cam pin of said first lens holder frame and the second cam pin of said second lens holder frame are positioned in substantial axial alignment with each other and circumferentially spaced from each other.

11. The collapsible lens barrel according to claim 1, wherein said base and said guide posts are made of synthetic resin and molded integrally with each other.

12. The collapsible lens barrel according to claim 2, wherein said base and said guide posts are made of synthetic resin and molded integrally with each other.

13. The collapsible lens barrel according to claim 1, wherein said base has three said guide posts disposed at equally spaced intervals in the circumferential direction of said cam ring.

14. The collapsible lens barrel according to claim 2, wherein said base has three said guide posts disposed at equally spaced intervals in the circumferential direction of said cam ring.

\* \* \* \* \*

UNITED STATES PATENT AND TRADEMARK OFFICE
CERTIFICATE OF CORRECTION

| | |
|---|---|
| PATENT NO. | : 7,236,312 B2 |
| APPLICATION NO. | : 11/207880 |
| DATED | : June 26, 2007 |
| INVENTOR(S) | : Tomohiro Yasui et al. |

It is certified that error appears in the above-identified patent and that said Letters Patent is hereby corrected as shown below:

In claim 5, column 14, line 25, "a I-shaped" should read --an I-shaped--.

In claim 5, column 14, lines 27-28, "web being is oriented" should read --web being oriented--.

In claim 6, column 14, line 32, "a I-shaped" should read --an I-shaped--.

In claim 6, column 14, lines 34-35, "web being is oriented" should read --web being oriented--.

In claim 7, column 14, line 43, "a I-shaped" should read --an I-shaped--.

In claim 7, column 14, line 45, "web being is oriented" should read --web being oriented--.

In claim 8, column 14, line 59, "a I-shaped" should read --an I-shaped--.

In claim 8, column 14, line 61, "web being is oriented" should read --web being oriented--.

In claim 9, column 15, line 4, "a I-shaped" should read --an I-shaped--.

In claim 9, column 15, lines 6-7, "web being is oriented" should read --web being oriented--.

UNITED STATES PATENT AND TRADEMARK OFFICE
CERTIFICATE OF CORRECTION

PATENT NO. : 7,236,312 B2
APPLICATION NO. : 11/207080
DATED : June 26, 2007
INVENTOR(S) : Tomohiro Yasui et al.

It is certified that error appears in the above-identified patent and that said Letters Patent is hereby corrected as shown below:

In claim 10, column 15, line 18, "a I-shaped" should read --an I-shaped--.

In claim 10, column 15, line 20, "web being is oriented" should read --web being oriented--.

Signed and Sealed this

Twentieth Day of November, 2007

JON W. DUDAS
*Director of the United States Patent and Trademark Office*